(12) United States Patent
Wu

(10) Patent No.: US 10,185,277 B1
(45) Date of Patent: Jan. 22, 2019

(54) TRANSMISSION DEVICE AND TRANSMISSION UNIT FOR PHOTOSENSITIVE DRUM AND DRUM UNIT HAVING THE TRANSMISSION UNIT

(71) Applicant: GENERAL PLASTIC INDUSTRIAL CO., LTD., Taichung (TW)

(72) Inventor: Yi-Chia Wu, Taichung (TW)

(73) Assignee: GENERAL PLASTIC INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/805,965

(22) Filed: Nov. 7, 2017

(30) Foreign Application Priority Data

Jul. 18, 2017 (TW) .............................. 106123964 A

(51) Int. Cl.
*G03G 15/00* (2006.01)
*F16D 1/112* (2006.01)
(52) U.S. Cl.
CPC ........... *G03G 15/757* (2013.01); *F16D 1/112* (2013.01)
(58) Field of Classification Search
CPC ...................................................... F16D 1/112
See application file for complete search history.

(56) References Cited

U.S. PATENT DOCUMENTS

| | | | | |
|---|---|---|---|---|
| 8,852,221 | B2* | 10/2014 | Boykin | ..................... B27B 5/32 606/171 |
| 9,031,465 | B2 | 5/2015 | Huang | |
| 9,091,994 | B2 | 7/2015 | Huang | |
| 9,091,995 | B2 | 7/2015 | Huang | |
| 9,098,048 | B2 | 8/2015 | Huang | |
| 2015/0153701 | A1* | 6/2015 | Huang | ................. G03G 15/757 399/167 |

* cited by examiner

*Primary Examiner* — Victor Verbitsky
(74) *Attorney, Agent, or Firm* — Muncy, Geissler, Olds & Lowe, P.C.

(57) ABSTRACT

The invention relates to a transmission device for engagement with a photosensitive drum having a drum axis, which includes a housing detachably attached to the photosensitive drum; a sleeve coupled with the housing and arranged coaxially to the drum axis; and a transmission unit having a shaft disposed to the sleeve and being rotatable about and movable along the drum axis relative to the sleeve. The shaft includes a first part, a second part and a bushing, each part has a body, the bodies of the first and second parts are detachably attached to each other, and the bushing is disposed outside the bodies of the first and second parts so that the first and second parts can be attached to each other firmly. Accordingly, the transmission device will not separate apart when it is driven to rotate.

20 Claims, 39 Drawing Sheets

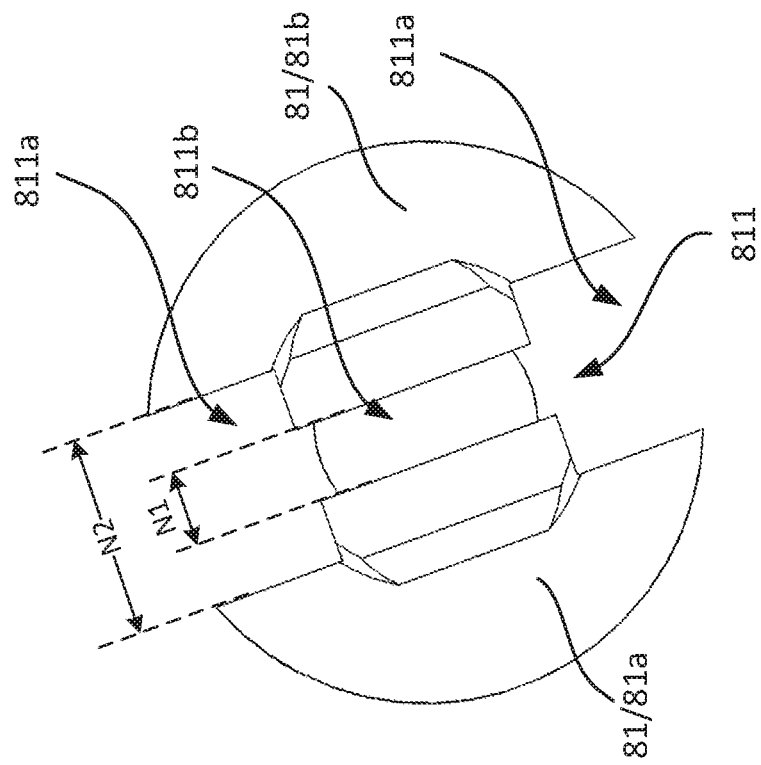
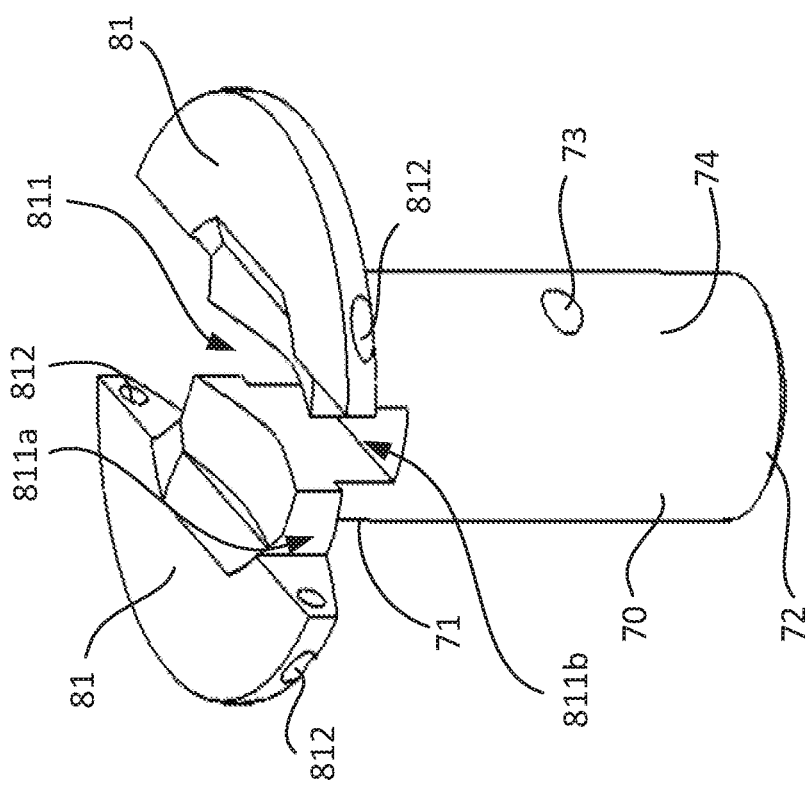

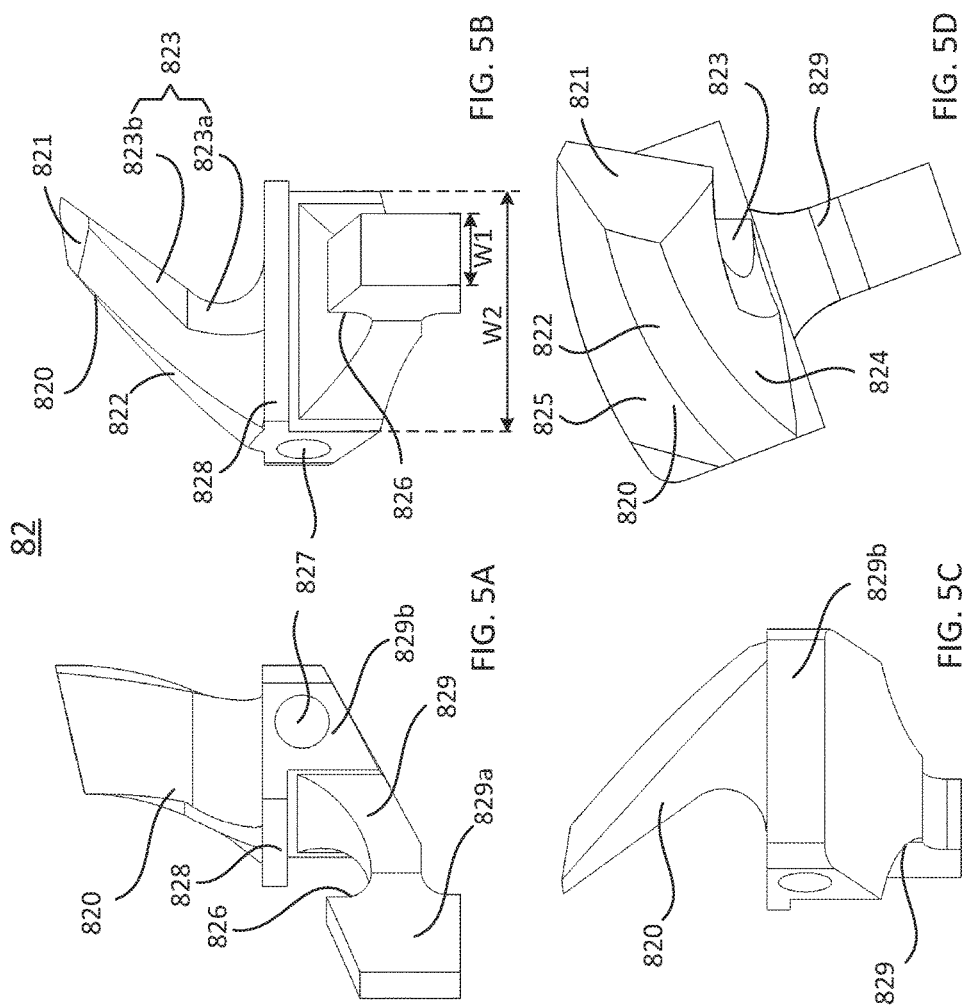

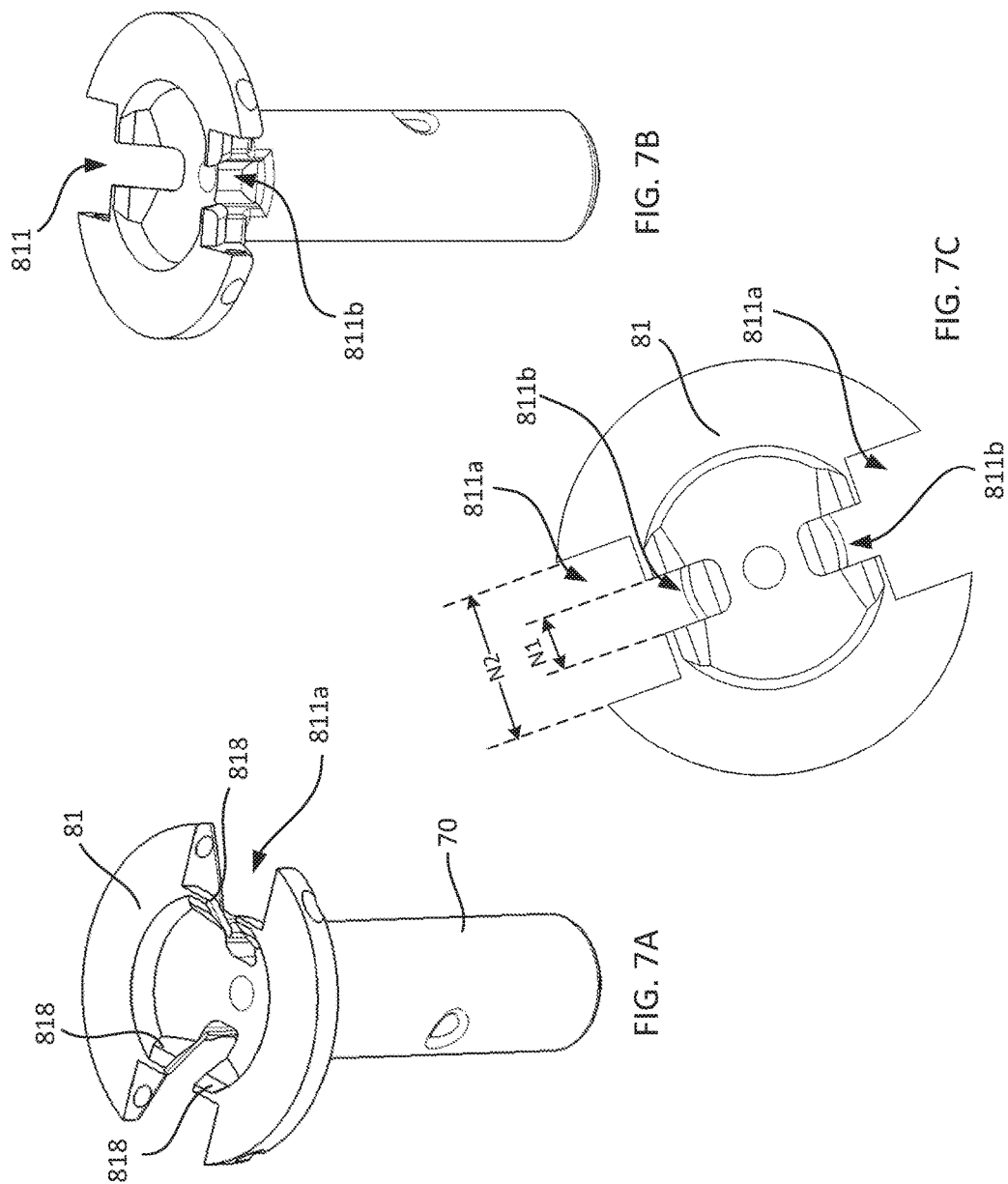

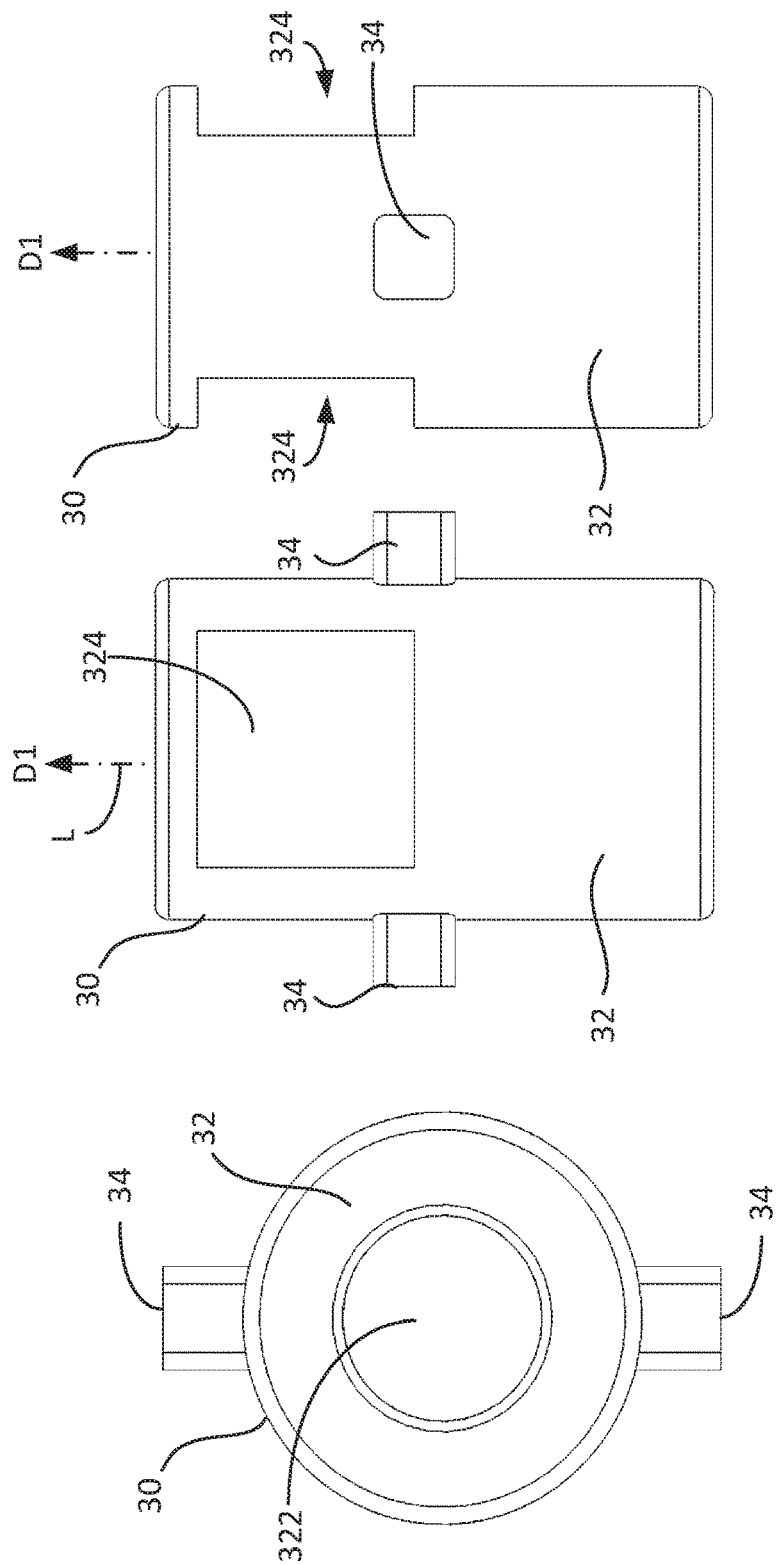

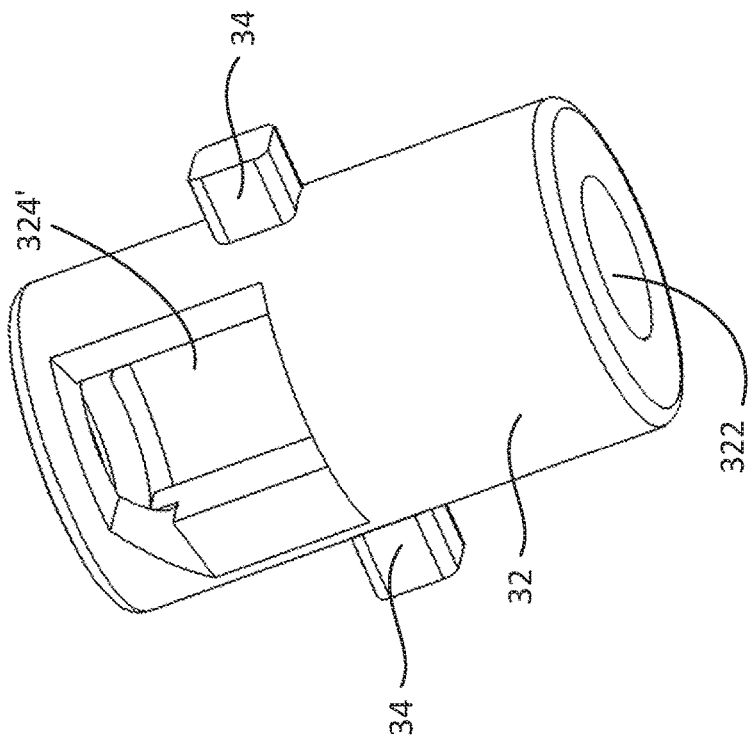
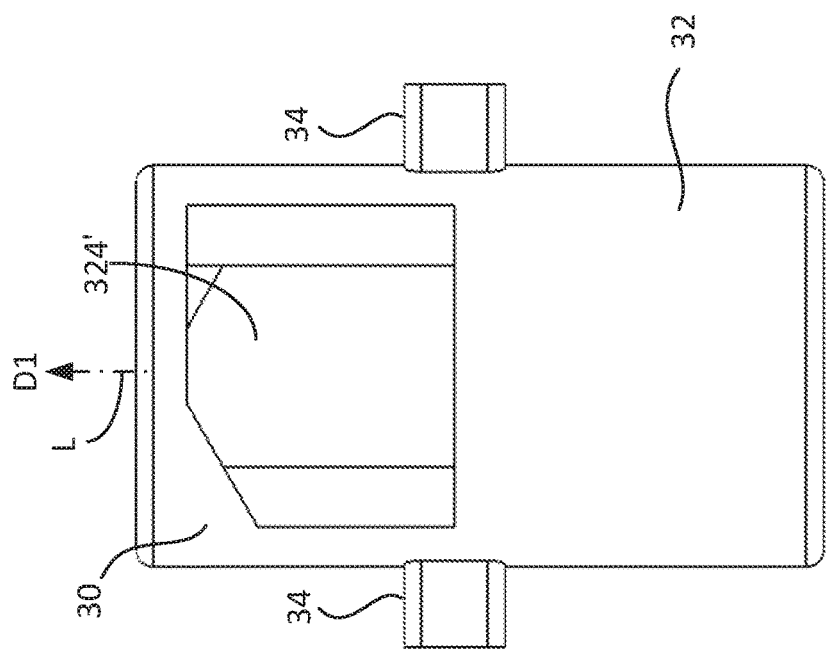
FIG. 12B
FIG. 12A

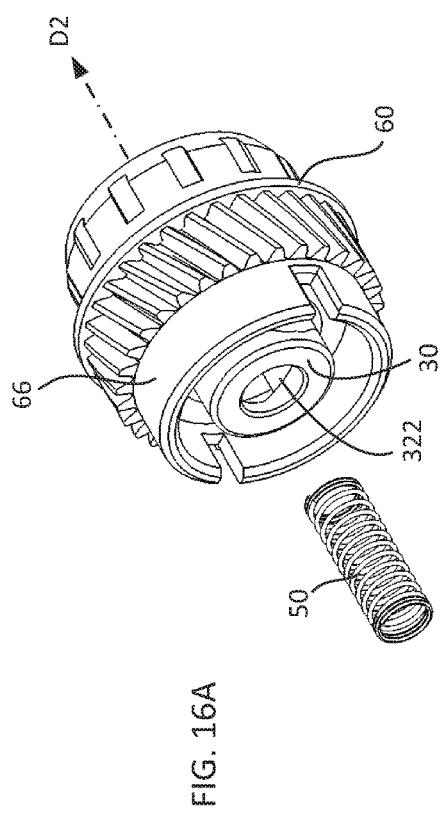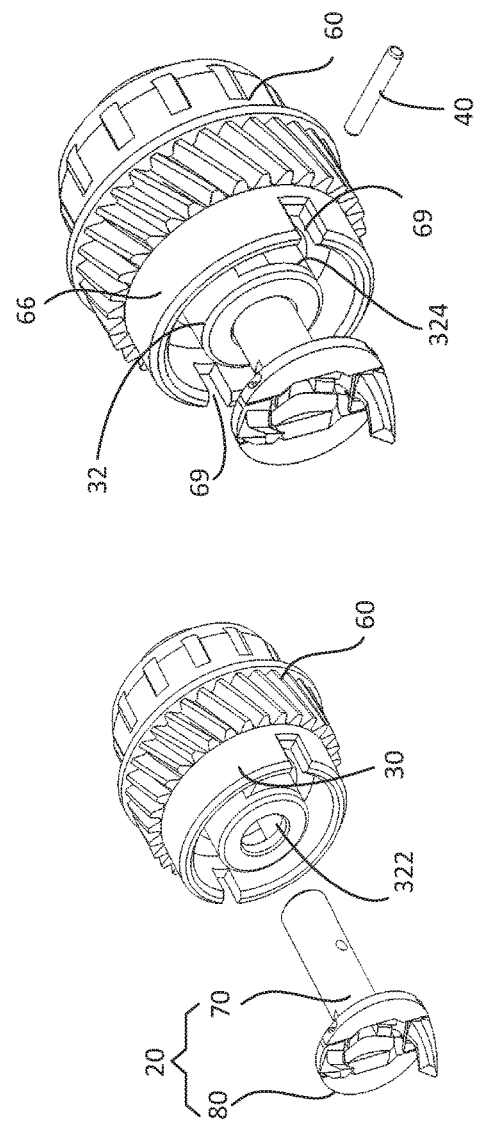

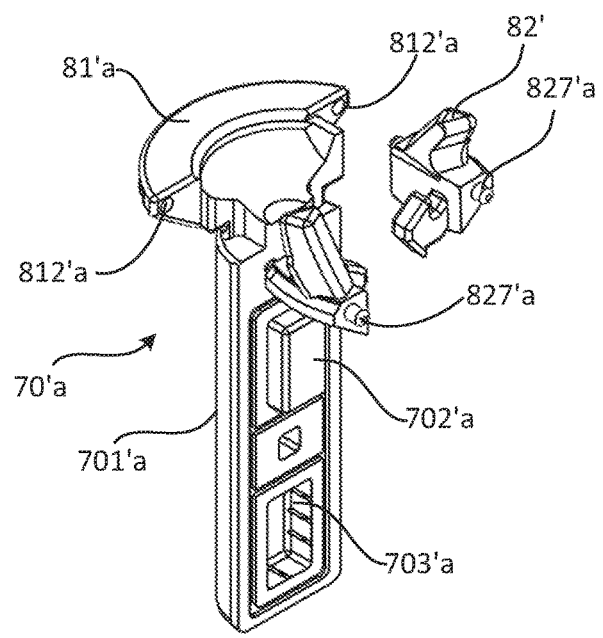
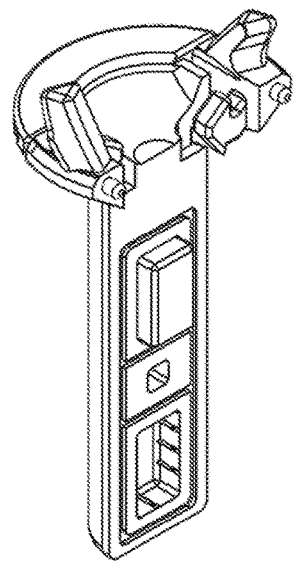
FIG. 19A  FIG. 19B
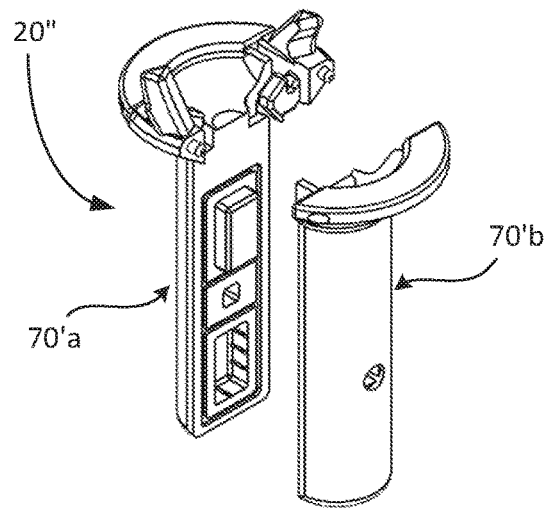
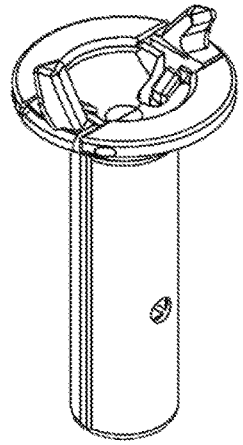
FIG. 19C  FIG. 19D

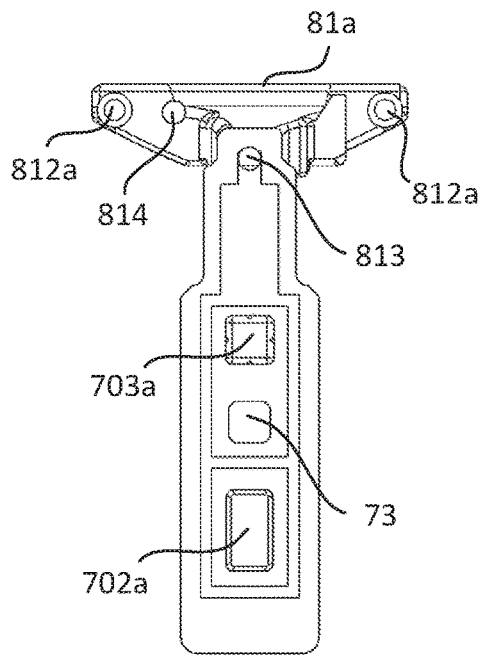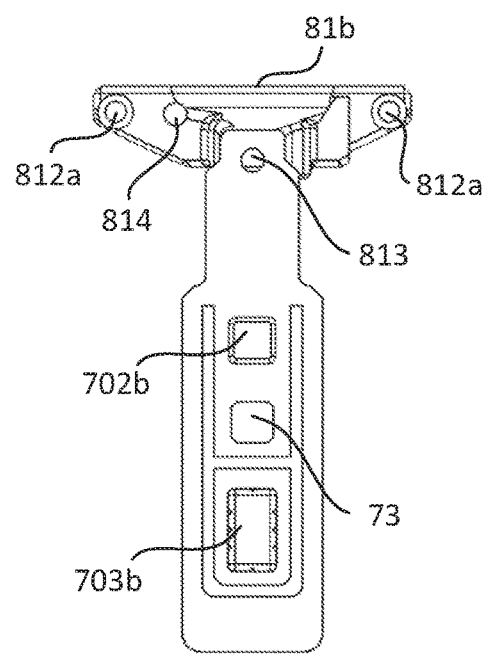
FIG. 25A  FIG. 25B
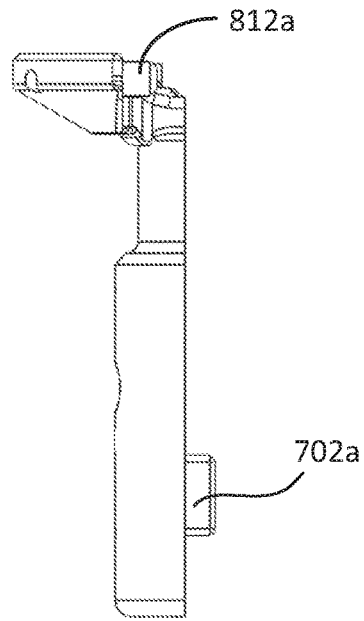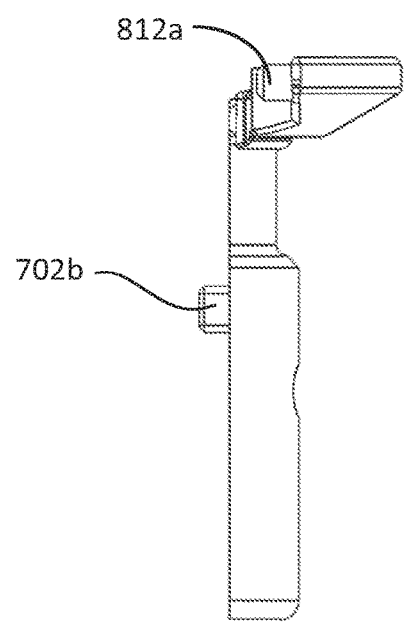
FIG. 25C  FIG. 25D

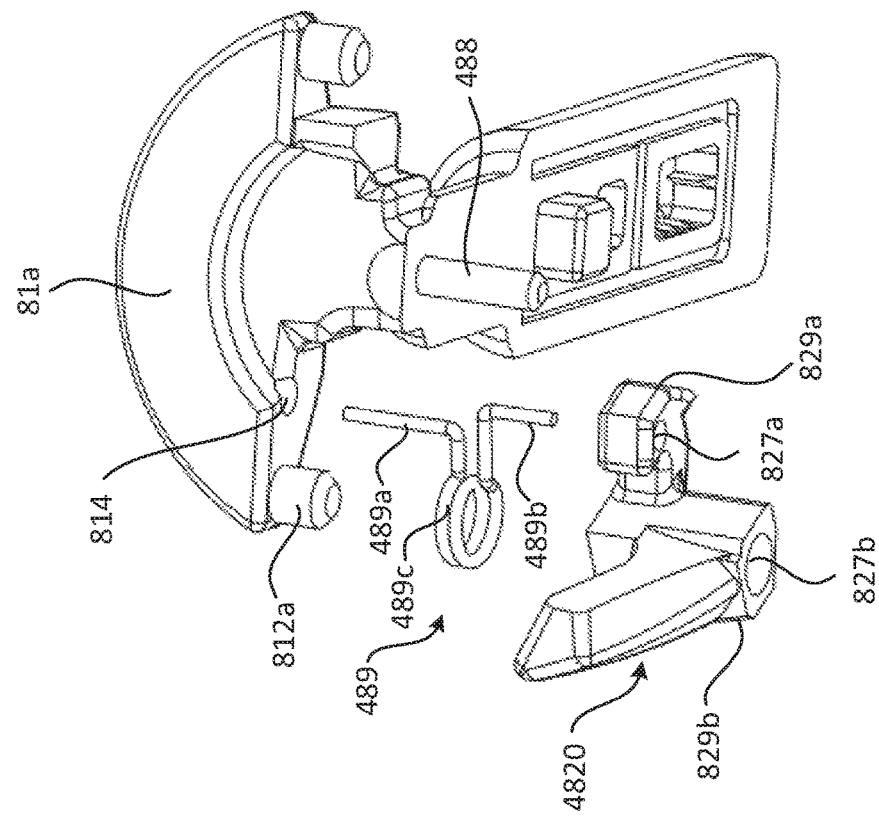
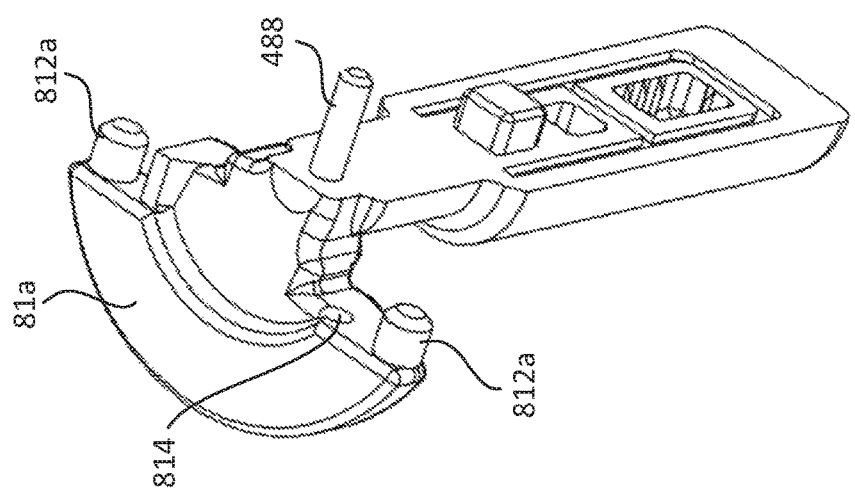
FIG. 26B
FIG. 26A

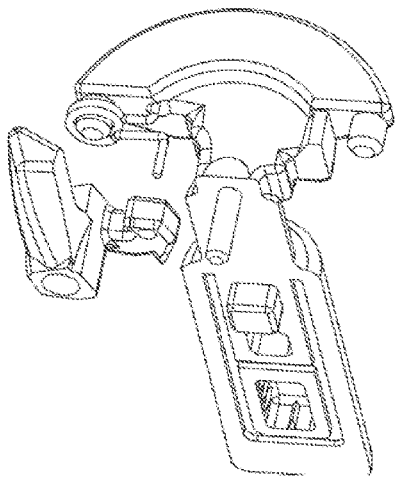
FIG. 27A
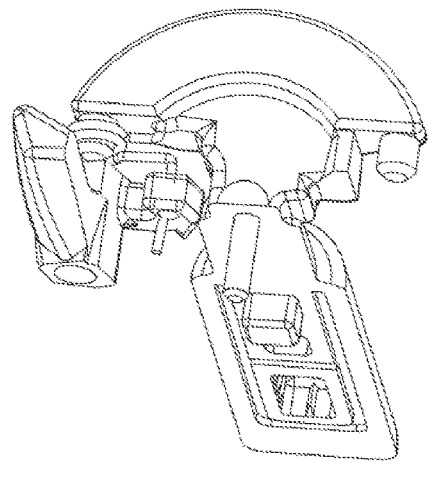
FIG. 27B
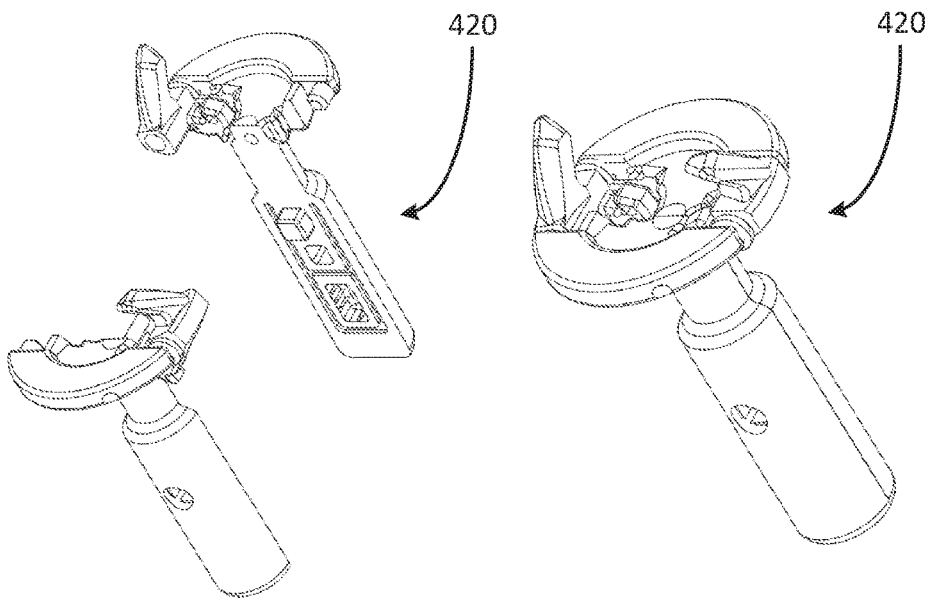
FIG. 27C
FIG. 27D

530

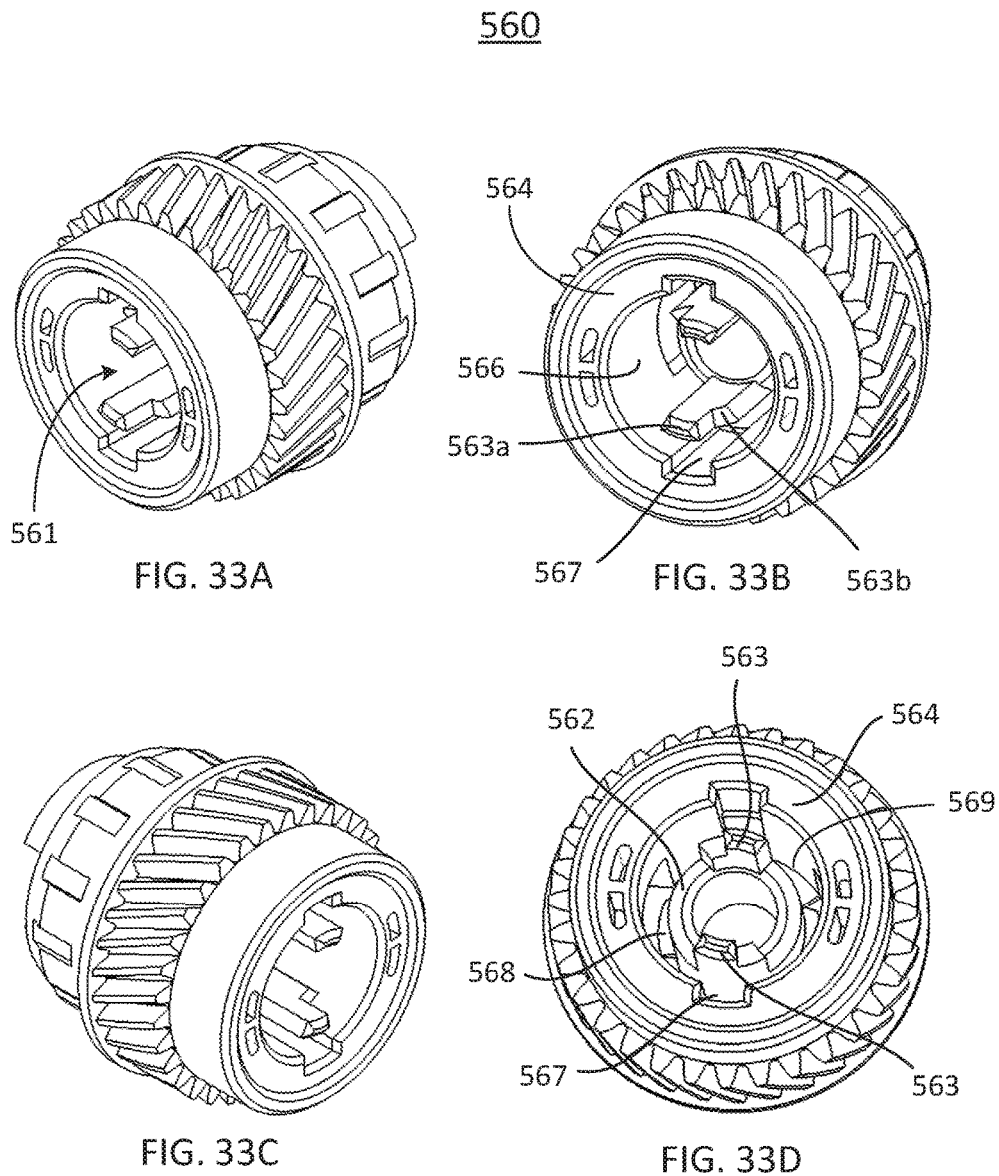

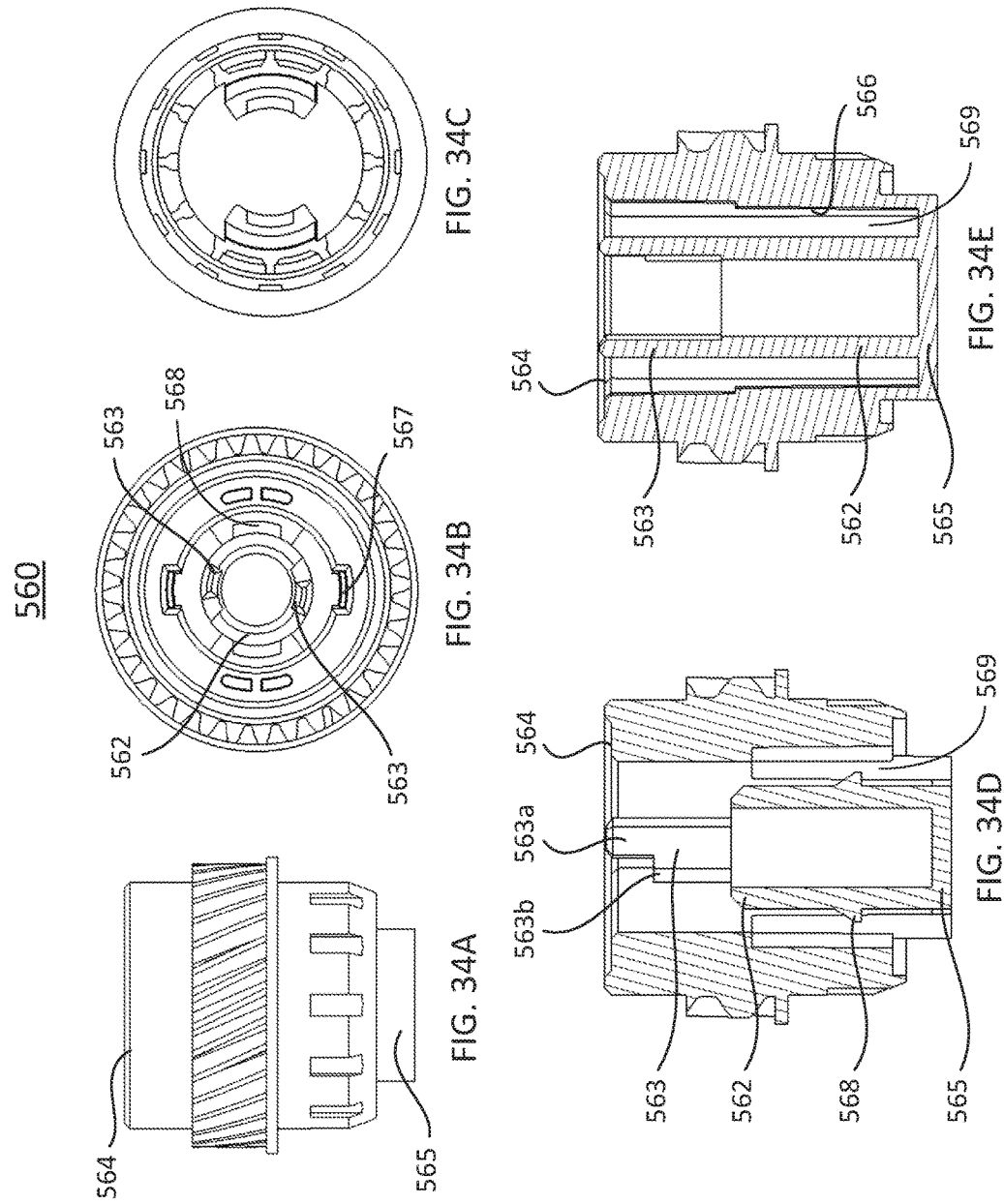

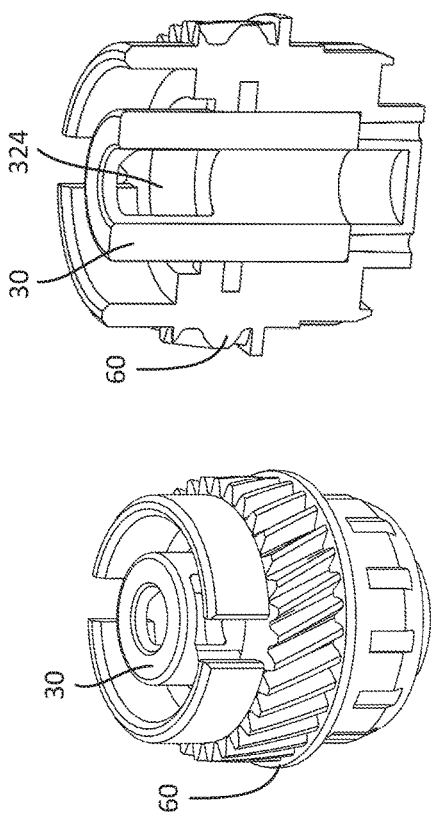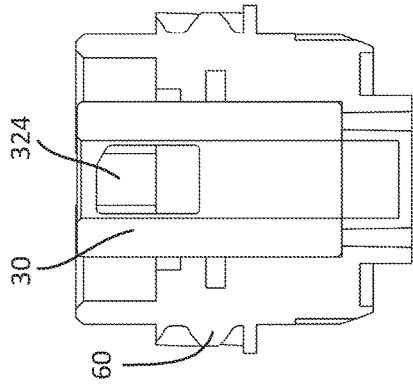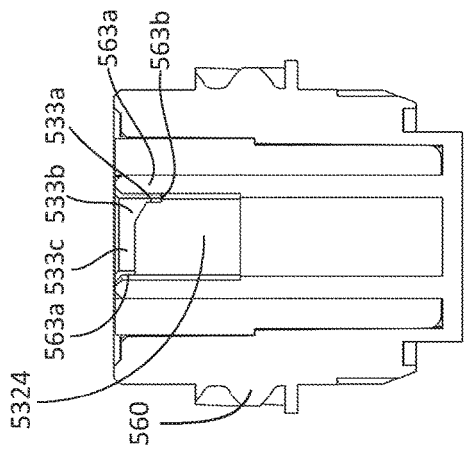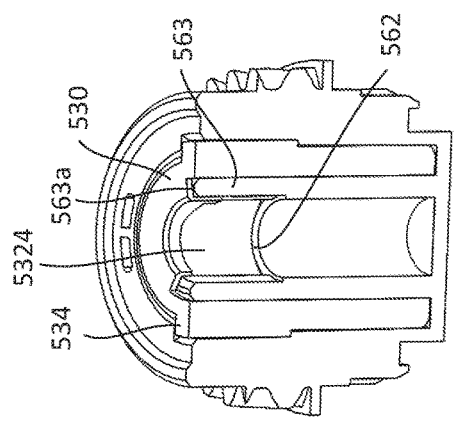

US 10,185,277 B1

TRANSMISSION DEVICE AND TRANSMISSION UNIT FOR PHOTOSENSITIVE DRUM AND DRUM UNIT HAVING THE TRANSMISSION UNIT

BACKGROUND OF THE INVENTION

1. Field of the Invention

The present invention relates generally to photosensitive drums mounted in electronic imaging devices, such as printers, copy machines, and so on, and more particularly, to a transmission device for a photosensitive drum and a drum unit including the same.

2. Description of the Related Art

Because electronic imaging devices can rapidly copy documents, the original documents with handwritten, printed, or drawn information can be completely copied by the electronic imaging devices, so that time required for transcription and duplication of the aforesaid original documents can be beneficially shortened.

One of the most important components of an electronic imaging device is a photosensitive drum, which is installed in a toner cartridge to conduct electricity when photosensitized and attract carbon powders at the same time to develop the to-be-printed document. A photosensitive drum primarily comprises a photosensitive cylinder and a transmission device attached to an end of the photosensitive cylinder. The transmission device is adapted to be connected with a drive member in a casing of an electronic imaging device to transmit rotatory kinetic energy of the drive member to the photosensitive cylinder.

There currently are a number of commercialized transmission devices with various structures can be selected, but some of them have drawbacks. For instance, when the driving force is transmitted to the transmission device by the drive member, part of the transmission device may be separated apart because of excessive torsion force, causing that the driving force cannot be transmitted to the transmission device by the drive member anymore.

SUMMARY OF THE INVENTION

The present invention has been accomplished in view of the above-noted circumstances. It is an objective of the present invention to provide a transmission device and a transmission unit for a photosensitive drum and a photosensitive drum having the transmission unit. The transmission device has firm structure so that it will not separate apart when being driven to rotate.

To attain the above objective, the present invention provides a transmission device for engagement with a photosensitive drum having a drum axis. The transmission device comprises a housing, a sleeve and a transmission unit. The housing is for being detachably and coaxially connected to the photosensitive drum. The sleeve is coaxially disposed in the housing so that the housing and the sleeve define at least one guiding groove therebetween. The transmission unit includes a shaft coaxially disposed in the sleeve and the shaft is coaxially rotatable and axially movable relative to the sleeve. A rotation range and a moving range of the shaft in relation to the sleeve are determined by the at least one guiding groove. The shaft includes a first part, a second part and a bushing, each part has a body and a base portion connected with an end of the body. The bodies of the first part and the second part are detachably attached to each other and the bushing is disposed outside the bodies of the first part and the second part. The base portions of each of the parts define a base of the shaft.

Because the first part and the second part can be attached to each other firmly through the bushing, the transmission device will not separate apart when it is driven to rotate.

BRIEF DESCRIPTION OF THE DRAWINGS

The accompanying drawings illustrate one or more embodiments of the present invention and, together with the description, serve to explain the principle of the present invention. In the embodiments, the same reference numerals used throughout the drawings denote the same or similar elements.

FIGS. 4A and 4B are respectively a perspective view and a top view of a part of a transmission unit utilized in a transmission device in accordance with one embodiment of the present invention;

FIGS. 5A to 5D are different views of an engagement block of a transmission unit utilized in a transmission device in accordance with one embodiment of the present invention;

FIGS. 7A, 7B and 7C are respectively a perspective view, another perspective view, and a top view of a part of a transmission unit utilized in a transmission device in accordance with another embodiment of the present invention;

FIGS. 11A, 11B and 11C are respectively a top view, a cross-sectional view, and another cross-sectional view of a sleeve utilized in a transmission device for a photosensitive drum in accordance with one embodiment of the present invention;

FIGS. 12A and 12B are respectively a cross-sectional view and a perspective view of a sleeve utilized in a transmission device for a drum unit in accordance with one embodiment of the present invention;

FIGS. 16A to 16C are schematic views showing an assembly process of a transmission device in accordance with one embodiment of the present invention;

FIGS. 19A to 19D are schematic views showing an assembly process of a transmission unit in accordance with another embodiment of the present invention;

FIGS. 25A to 25D are different schematic views of a part of a transmission unit utilized in a transmission device in accordance with one embodiment of the present invention;

FIGS. 26A to 26B and 27A to 27D are schematic views showing a transmission unit and an assembly process thereof in accordance with one embodiment of the present invention;

FIGS. 33A to 33D are different perspective views of a housing (gear member) utilized in a transmission device for a drum unit in accordance with one embodiment of the present invention;

FIGS. 34A, 34B, 34C and 34D to 34E are respectively a side view, a top view, a bottom view and cross-sectional views of the housing shown in FIG. 33;

FIGS. 37A, 37B and 37C and FIGS. 37D, 37E and 37F are respectively perspective views, partially perspective views, and cross-sectional views of assembled sleeves and housings of transmission devices for a photosensitive drum in accordance with two embodiments of the present invention;

DETAILED DESCRIPTION OF EMBODIMENTS

Figure 1:
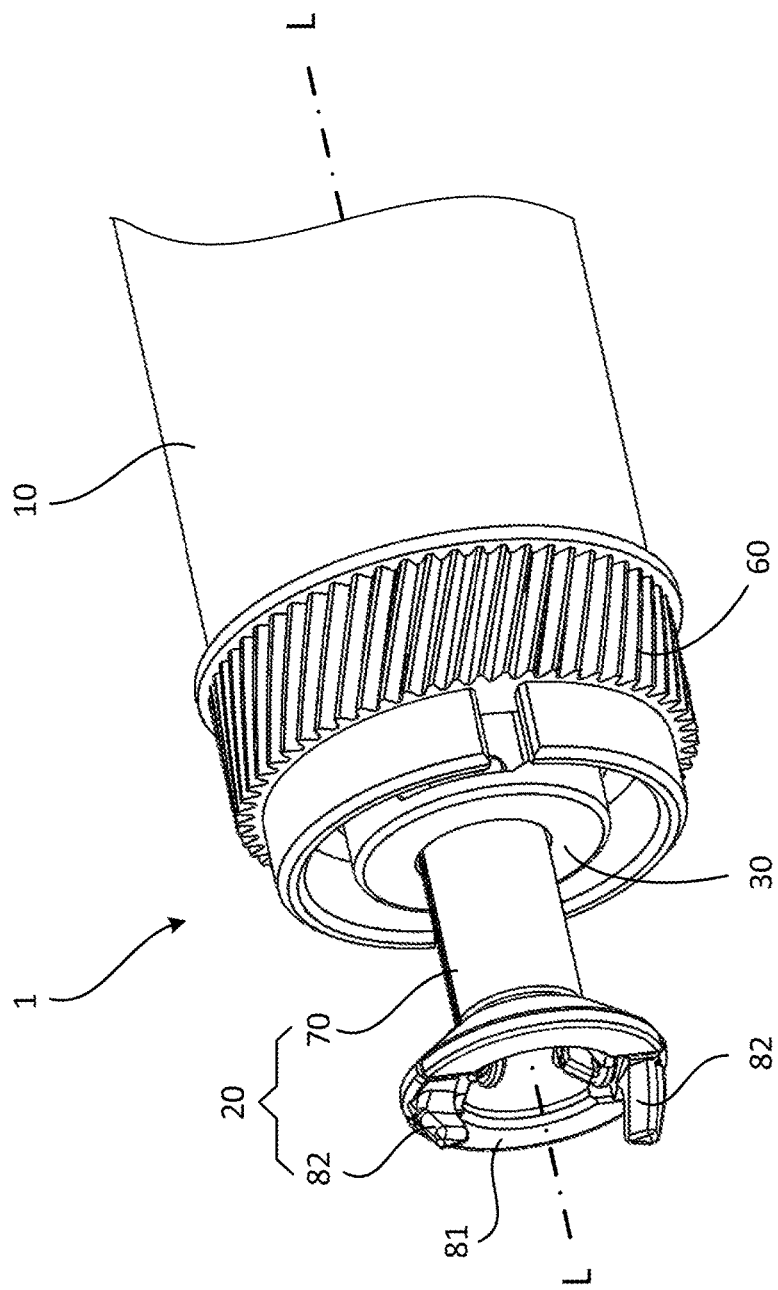
FIG. 1 is a part schematic perspective view of a drum unit in accordance with one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these teal's. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the FIGS. It will be understood that relative terms are intended to encompass different orientations of the device in addition to the orientation shown in the FIGS. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate values, meaning that the terms "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

The description is now made as to the embodiments of the present invention in conjunction with the accompanying drawings. In accordance with the purposes of this invention, as embodied and broadly described herein, this invention relates to a drum unit having a transmission device for a photosensitive drum engaged with electronic imaging devices, such as printers, copy machines, and so on.

FIG. 1 is a part schematic perspective view of a drum unit in accordance with one embodiment of the present invention. The drum unit includes a photosensitive drum 10 having a drum axis L, and a transmission device 1 detachably attached to the photosensitive drum 10 and arranged coaxially to the drum axis L. The transmission device 1 is used to receive a rotational driving force from a driving mechanism of an electronic imaging device and transmit the rotational driving force to the photosensitive drum 10. The photosensitive drum 10 in turn rotates around the axis L under the rotational driving force repeatedly.

In the present embodiment, the transmission device 1 includes a housing 60 (also known as a gear member, i.e. the terms "housing" and "gear member" used in the disclosure are exchangeable) detachably attached to one end of the photosensitive drum 10 and arranged coaxially to the drum axis L, a sleeve 30 coupled with the housing 60 and arranged coaxially to the drum axis L, and a transmission unit 20 disposed to the sleeve 30 and arranged coaxially to the drum axis L. In one embodiment, the sleeve 30 is integrally formed with the housing 60 coaxially to the drum axis L. The transmission unit 20 comprises a shaft 70, a base 81, and at least two engagement blocks 82. The shaft 70 is rotatable about the drum axis L relative to the sleeve 30 and is moveable along the drum axis L relative to the sleeve 30. The base 81 is extended from one end of the shaft 70 integrally. The at least two engagement blocks 82 extend outwardly from two opposite sides of the base 81 and away from the drum axis L, such that each of the two engagement blocks 82 is respectively rotatable around a pivotal axis perpendicular to the drum axis L and provided at each of the two opposite sides of the base 81.

Various embodiments of the transmission devices of the present invention are described in detail as follows.

Figure 2A:
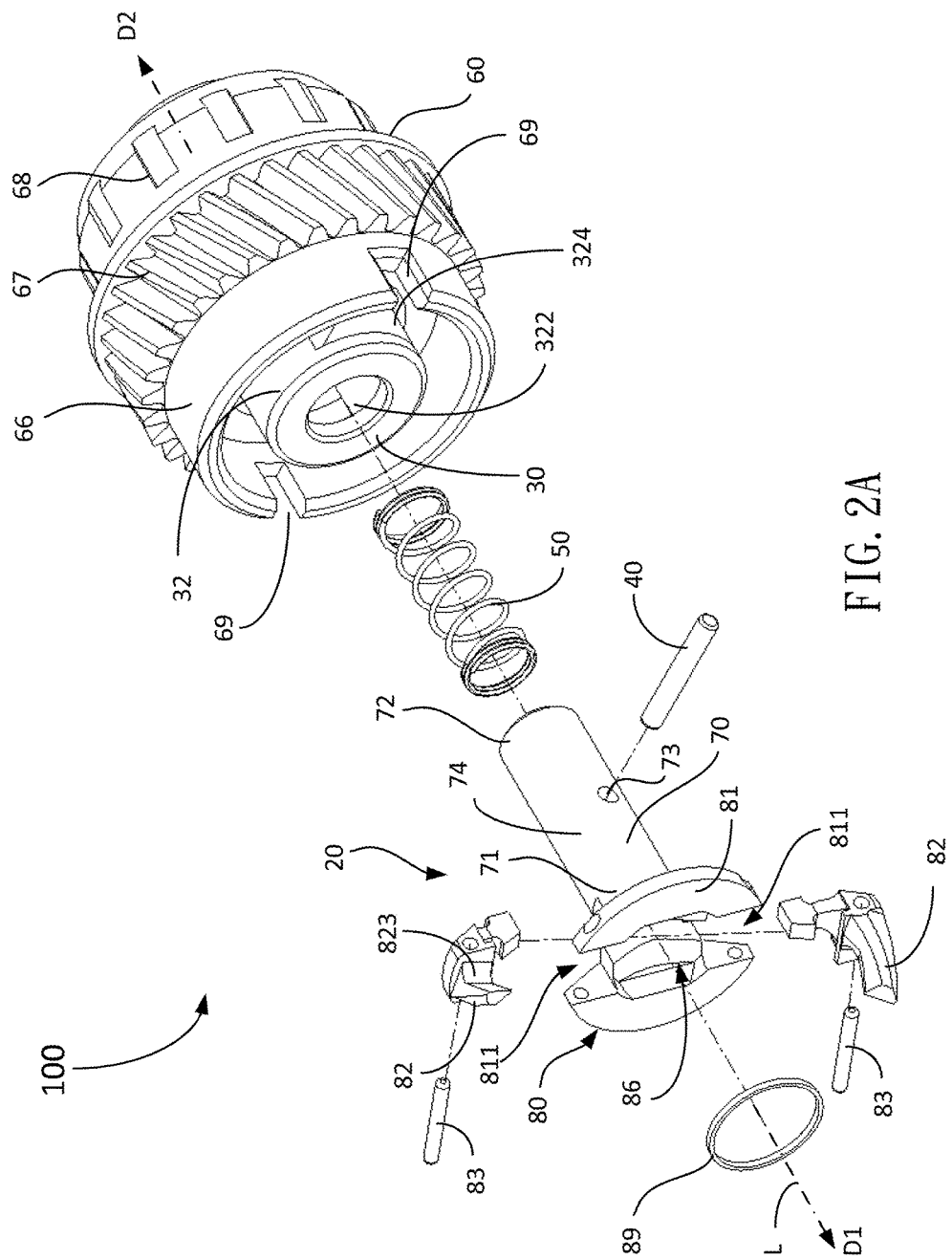
FIG. 2A is an exploded perspective view of a transmission device utilized in a drum unit in accordance with one embodiment of the present invention.
Figure 2B:
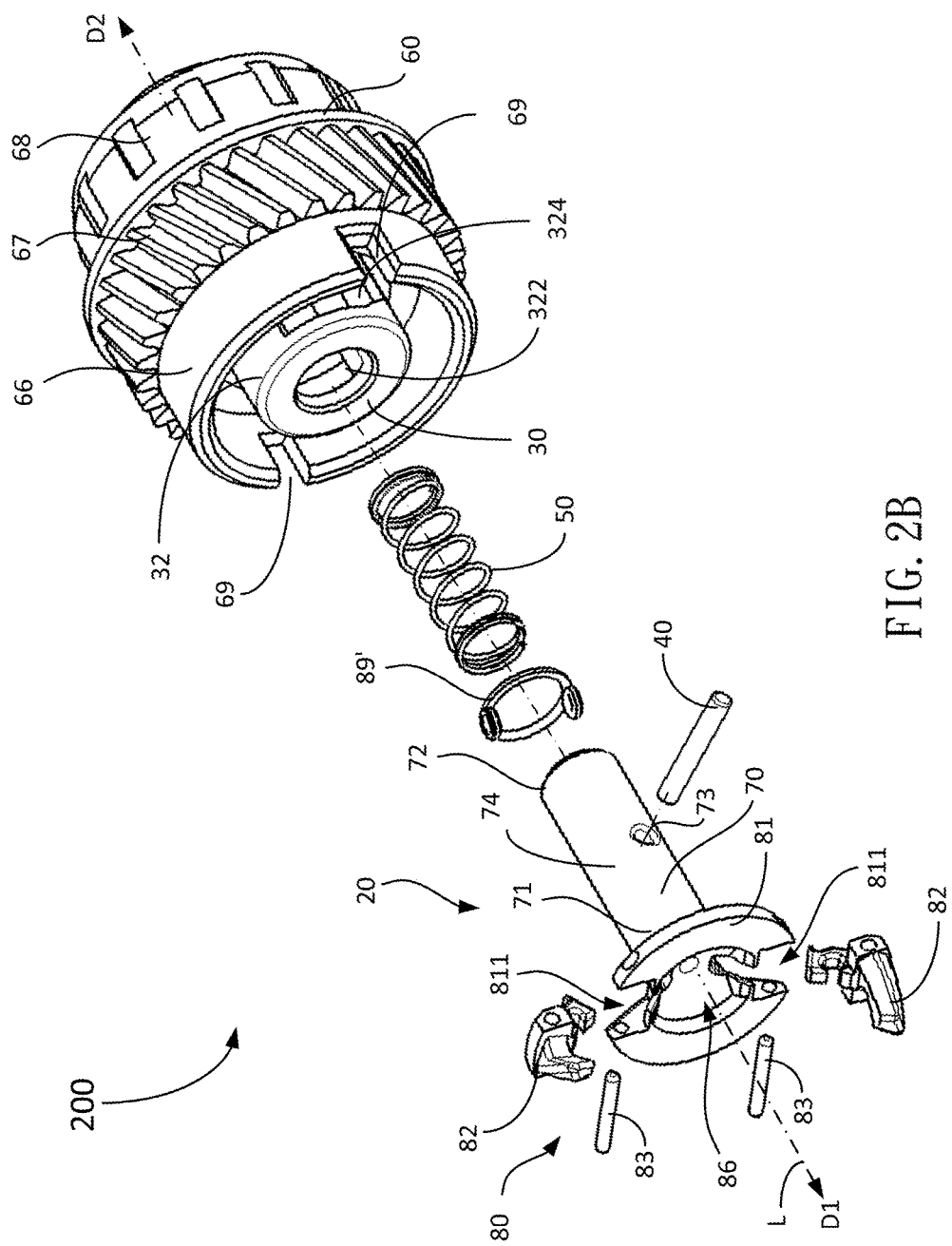
FIG. 2B is an exploded perspective view of a transmission device utilized in a drum unit in accordance with another embodiment of the present invention.

Referring to FIG. 2A, a transmission device 100 of a drum unit according to one embodiment of the present invention comprises a transmission unit 20, a sleeve 30, an elastic member 50, and a gear member (also known as a housing in the disclosure) 60. FIG. 2B is another embodiment of a transmission device 200 of a drum unit, which is essentially the same as the transmission device 100 shown in FIG. 2A, except that the elastic holding member 89 of the transmission device 100 is different from the elastic holding member 89' of the transmission device 200.

As shown in FIGS. 2A, 2B and 4 to 10, the transmission unit 20 includes a shaft 70 and an engagement structure 80. The shaft 70 has a cylindrical shaft body 74 and at least one protrusion 75 extending radially outwardly from the shaft body 74. The shaft body 74 is an elongated element extending along the drum axis L and provided with a first end 71 facing toward a first direction D1, a second end 72 facing toward a second direction D2 opposite to the first direction D1, and a through hole 73 radially penetrating through the main portion of the shaft body 74. In one embodiment, a pin 40 is inserted into the through hole 73 and two ends of the pin 40 sticking out of the through hole 73 form the protrusions 75.

The engagement structure 80 includes a base 81 integrally extending from the first end 71 of the shaft 70, and a recess 811 formed in the base 81. The base 81 has two pairs of through holes 812 in communication with the recess 811.

As shown in FIGS. 4 and 7, the recess 811 has two openings 811a symmetrically located in two opposite sides of the base 81, and two grooves 811b located in the base 81 and the first end 71 of the shaft 70. The two grooves 811b respectively communicate with the two openings 811a. As shown in FIG. 7, each groove 811b has a width N1 and each opening 811a has a width N2 greater than the width N1 of each groove 811b. In one embodiment, as shown in FIG. 7, the recess 811 is provided with a plurality of barriers 818 to prevent the engagement block 82 from over-rotating toward the drum axis L in operation. In addition, the two grooves 811b may communicate with each other to form a slot, and the base 81 is thus separated into two portions 81a and 81b, as shown in FIG. 4.

The engagement structure 80 also includes two engagement blocks 82. In this embodiment, the engagement blocks 82 are L-shaped, however, other types of the engagement blocks may also be used to implement the present invention. Each of the engagement blocks 82 has a bottom member 829 and engagement claw 820. The bottom member 829 has a first end portion 829a equipped with a hook 826 and an opposite second end portion 829b. The engagement claw 820 extends upwardly (or vertically) from the second end portion 829b of the bottom member 829. The two engagement blocks 82 are pivotally received in two opposite sides of the recess 811 respectively, so that each engagement block 82 is rotatable around a pivotal axis, which is perpendicular to the drum axis L, at the second end portion 829b of the bottom member 829. Normally, the first end portion 829a of the bottom member 829 is toward the drum axis L and the engagement claw 820 extends helically toward the first direction D1. The two engagement blocks 82 define a receiving space 86 therebetween for accommodating a drive member (driving mechanism) of an electronic imaging device.

As shown in FIGS. 5 and 8, each engagement block 82 has an outer surface 825 extending gradually closed to the drum axis L toward the first direction D1, an inner surface 824 facing the receiving space 86, an inclined surface 822 located at a junction between the outer surface 825 and the inner surface 824, an engagement concave 823 located at another junction between the outer surface 825 and the inner surface 824, and a top end 823 located between the inclined surface 822 and the engagement concave 823. The included angle between the extending direction of the inclined surface 822 and the drum axis L is about 30 to 80 degrees. The engagement concaves 823 of the engagement blocks 82 are opened substantially toward opposite directions for allowing the pillars 92 of the drive member of the electronic imaging device to enter the engagement concave 823 through the openings of the engagement concaves 823. Each engagement concave 823 has an arched recess 823a and a limiting surface 823b located between the recess 823a and the top end 821 and substantially inclined from the top end 821 toward the inclined surface 822.

As shown in FIGS. 5 and 8, the first end portion 829a and the second end portion 829b of the bottom member 829 of each of the engagement blocks 82 have a first width W1 and a second width W2 greater than the first width W1.

In certain embodiments, the hook 826 of each engagement block 82 is a T-shaped hook. In addition, each engagement block 82 has a through hole 827 located at the second end portion 829b of the bottom member 829, as shown in FIGS. 5 and 8. The through hole 827 is coincident with the pivotal axis.

Further, each engagement block 82 has a rotation limiting member 828 formed in the second portion 829b of the bottom member 829 and being toward the first end portion 829a of the bottom member 829. In one embodiment, as shown in FIG. 5, the rotation limiting member 828 extends from one side to the other side of the second end portion 829b of the bottom member 829, and has a width W2 the same as that of the second end portion 829b of the bottom member 829. However, in another embodiment, as shown in FIG. 8, the rotation limiting member 828' extends from the middle of the second end portion 829b of the bottom member 829, and has a width W1 essentially the same as that of the first end portion 829a of the bottom member 829 and less than the width W2 of the second end portion 829b of the bottom member 829.

Figure 3B:
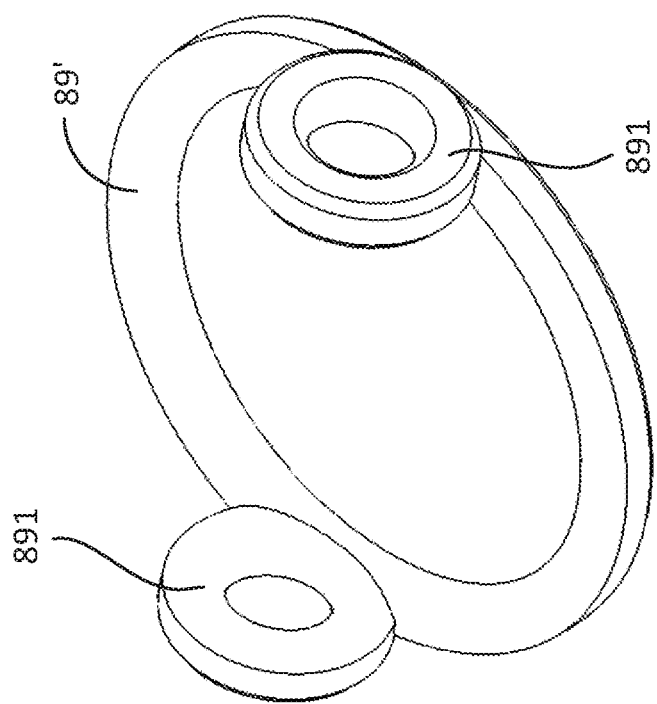
FIGS. 3A and 3B are perspective views of holding members respectively utilized in two transmission devices in accordance with two embodiments of the present invention.
Figure 3A:
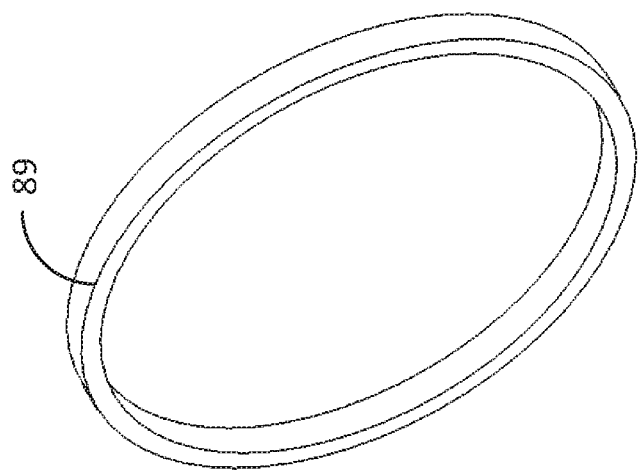

Moreover, the engagement structure 80 also includes a holding member 89 engaged with the hook 826 of the bottom member 829 of each engagement block 82. The holding member 89 may be an elastic ring, a magnet, or a spring. In this embodiment, as shown in FIG. 3A, the holding member is an elastic ring 89, which may be formed of an elastic material such as plastic or silicone. In this embodiment, the hooks 826 of the bottom members 829 of the two engagement blocks 82 are hooked by the elastic ring 89. In another embodiment, as shown in FIG. 3B, the elastic ring 89' has two ring portions 891 formed on the two opposite sides of the elastic ring 89'. As such, the hooks 816 of the bottom members 829 of the two engagement blocks 82 are hooked by the ring portions 891 of the elastic ring 89'. Alternatively, a spring may be used to connect the hooks 826 of the bottom members 829 of the two engagement blocks 82. In addition, a magnetic force may also be used to force the two engagement blocks 82 to be in the normal state.

As noted above, the two engagement blocks of the transmission unit may have various configurations. For instance, the engagement claw 820, instead of being inclined relative to the drum axis, may be a protrusion extending toward the drum axis. The engagement claw may be of any configuration as long as the engagement claw can be engaged with a drive member of an electronic imaging device. In another embodiment, the elastic ring may be replaced with a tensioning device that is part of the engagement blocks. For example, the pins about which the engagement blocks rotate may have an integral elastic member, such as a spring, so that the engagement claws 820 of the engagement blocks 82 can be returned to an upright position. In addition, the bottom member 829 of each engagement block 82 protrudes upwardly from the recess 811 such that the drive member of the electronic imaging device connects with the bottom member 829 of each engagement block 82 to return the engagement claws 820 to an upright position.

Figure 9C:
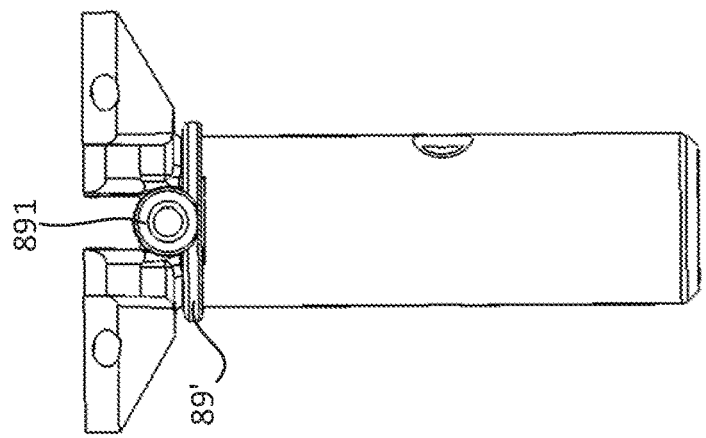
FIGS. 9A to 9C and 10A to 10F are schematic views showing an assembly process of a transmission unit utilized in a transmission device in accordance with another embodiment of the present invention.
Figure 9B:
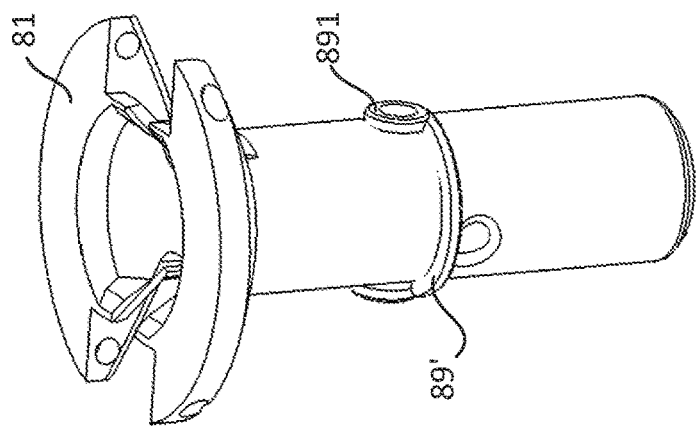
Figure 9A:
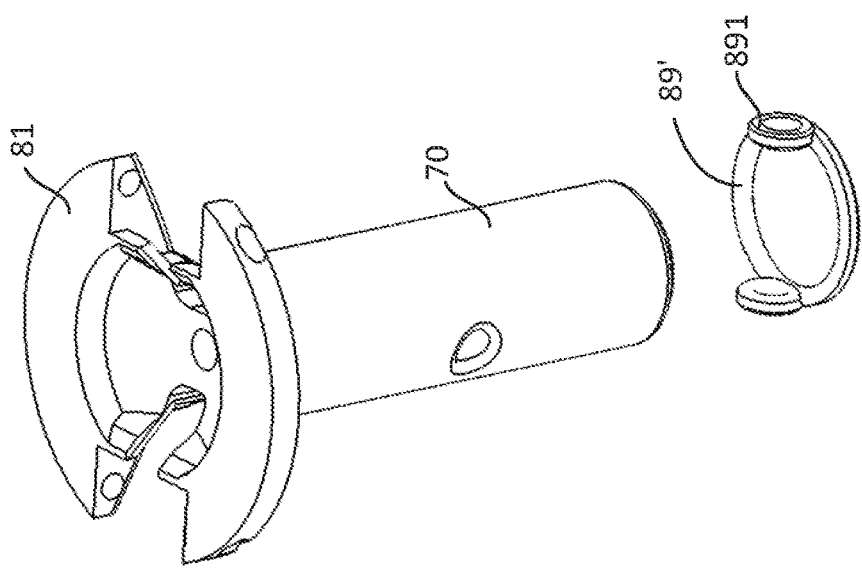

According to the present invention, the assembly process of the transmission unit 20 is very simple. As shown in FIGS. 6A to 6F, 9A to 9C, and 10A to 10F, the two engagement blocks 82 are received in the recess 811 and pivotally secured to the base 81 through two pins 83. For example, each engagement block 82 is placed into a respective opening 811*a* and groove 811*b*, two pins 83 are respectively inserted through the through holes 827 of the engagement blocks 82 and two pairs of the holes 812 of the base 81, so that the engagement blocks 82 are pivotally attached to the base 81. The holding member (elastic ring) 89 is then placed to hook the hooks 826 of the two engagement blocks 82, as shown in FIG. 6A to 6F. Alternatively, as shown in FIGS. 9 and 10, the shaft 70 is first inserted in the elastic ring 89' to position the ring portions 891 in the grooves 811*b*. Then, each engagement block 82 is placed into a respective opening 811*a* and groove 811*b*, the hooks 826 of the two engagement blocks 82 are inserted into the ring portions 891 of the elastic ring 89', and two pins 83 are respectively inserted through the through holes 827 of the engagement blocks 82 and two pairs of the holes 812 of the base 81, such that the engagement blocks 82 are pivotally attached to the base 81.

Figure 6B:
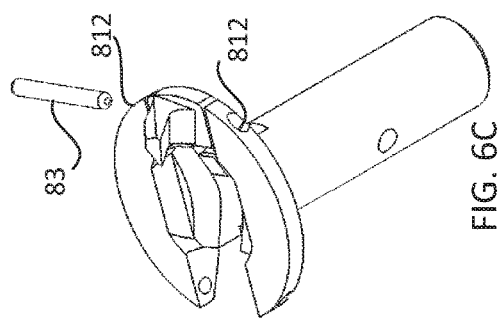
FIGS. 6A to 6F are schematic views showing an assembly process of a transmission unit utilized in a transmission device in accordance with the present invention.
Figure 6C:
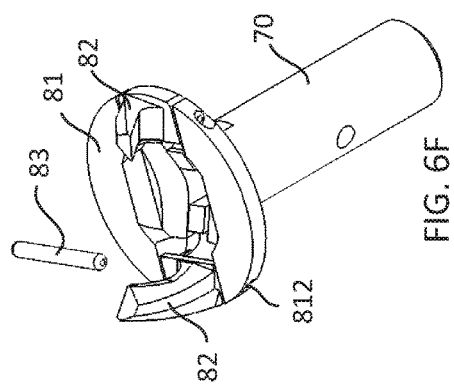
Figure 6E:
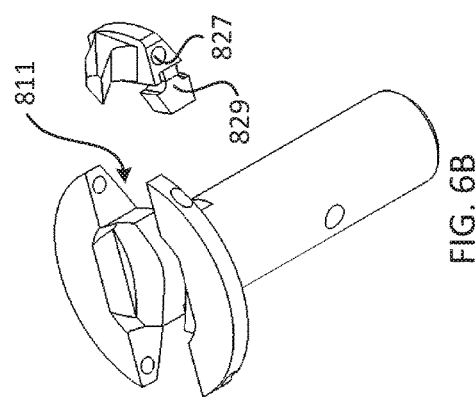
Figure 6F:
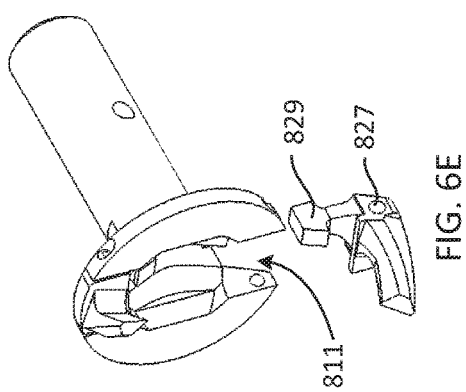
Figure 6A:
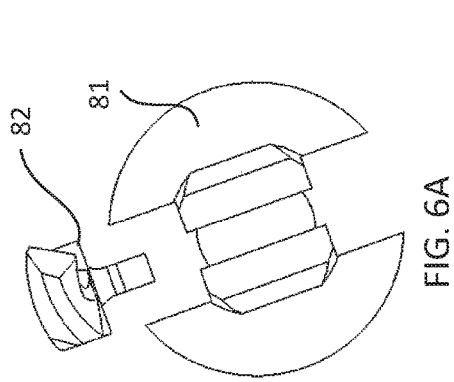
Figure 6D:
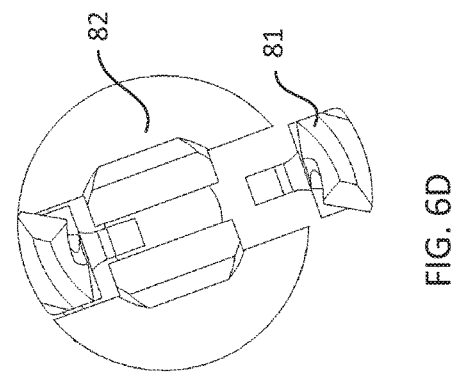
Figure 8B:
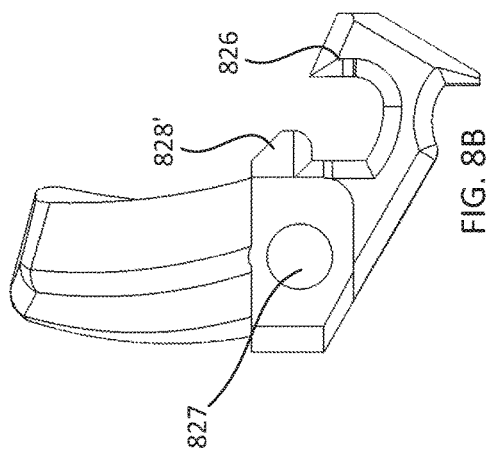
FIGS. 8A to 8D are different views of an engagement block of a transmission unit utilized in a transmission device in accordance with another embodiment of the present invention.
Figure 8D:
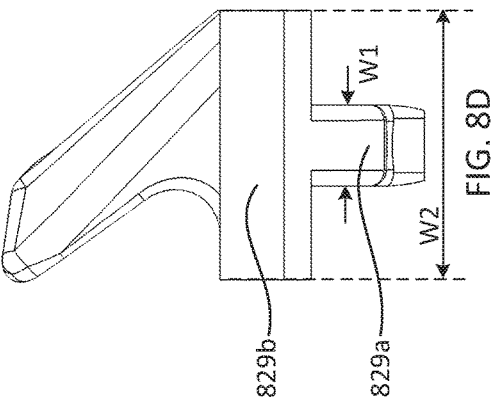
Figure 8A:
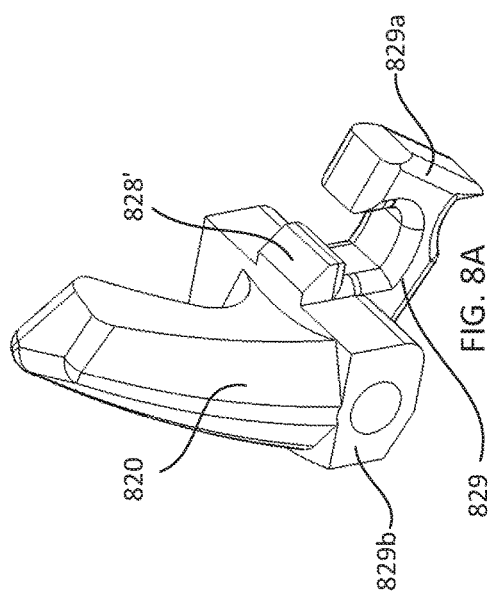
Figure 8C:
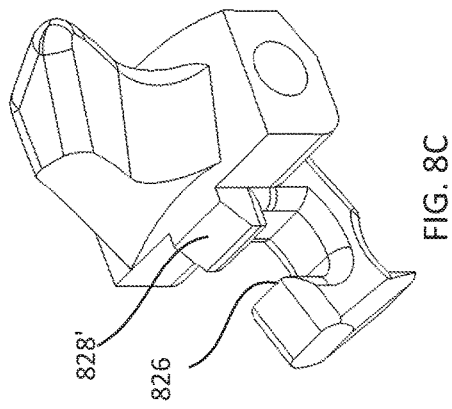
Figure 10A:
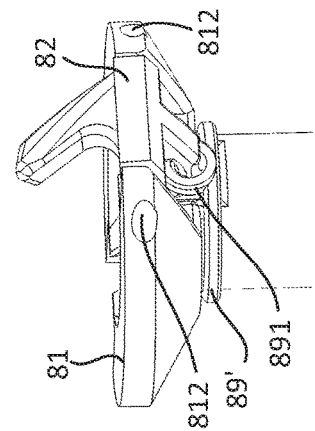
Figure 10B:
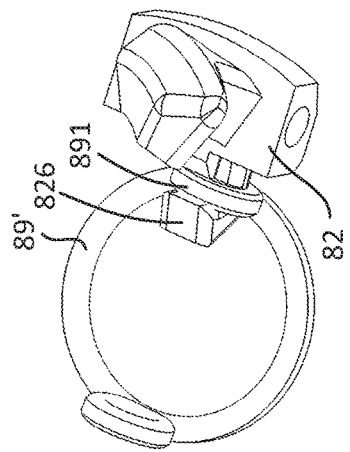
Figure 10C:
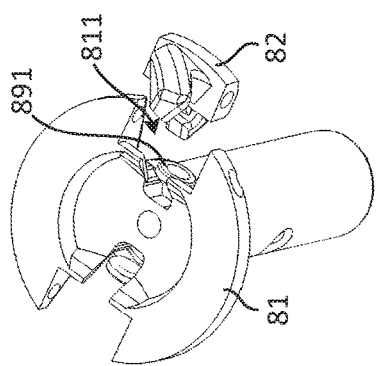
Figure 10D:
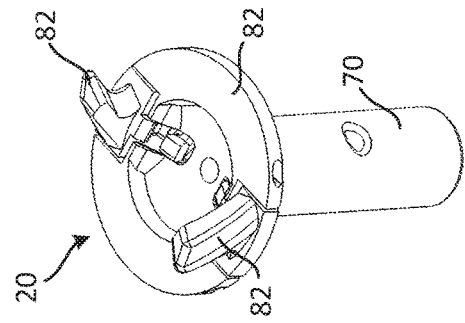
Figure 10E:
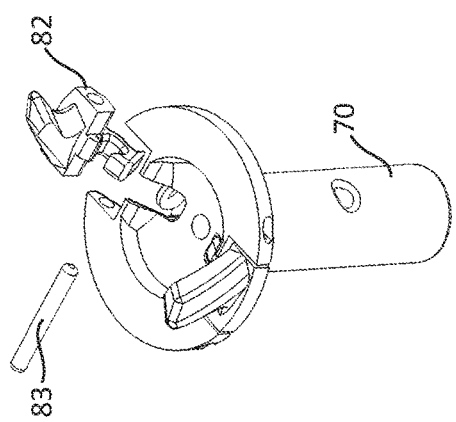
Figure 10F:
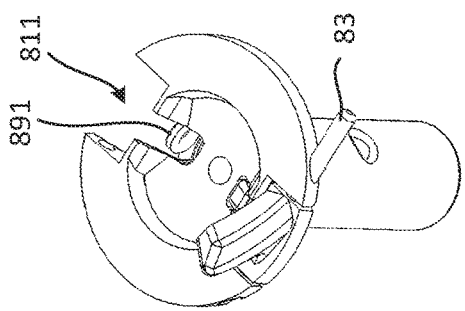
Figure 13B:
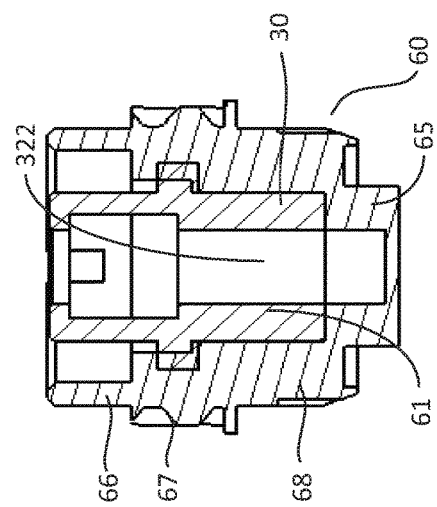
FIGS. 13A, 13B, 13C and 13D are respectively a perspective view, a top view, a cross-sectional view, and another cross-sectional view of a gear member and a sleeve assembled in the gear member utilized in a transmission device in accordance with one embodiment of the present invention.
Figure 13D:
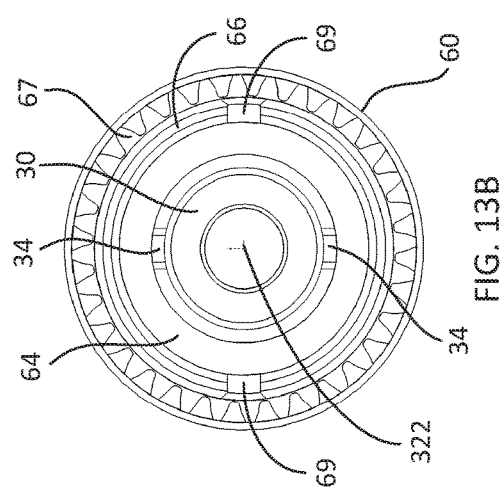
Figure 13A:
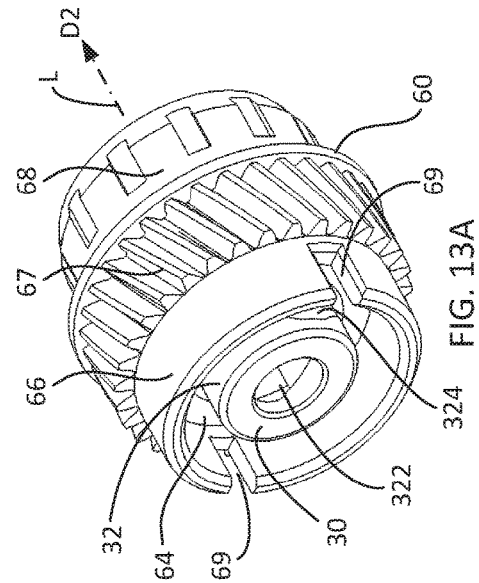
Figure 13C:
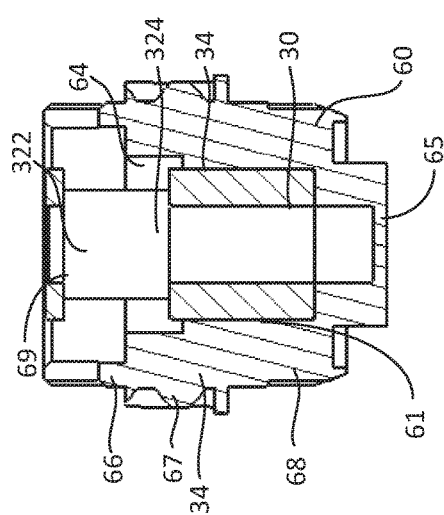
Figure 15:
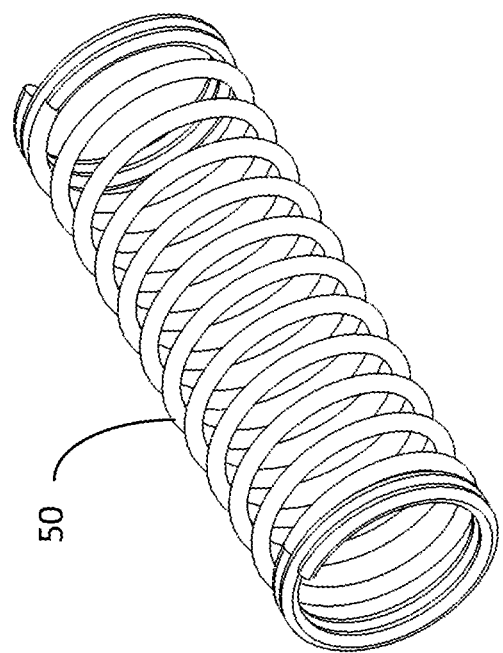
FIG. 15 is a perspective view of an elastic member utilized in a transmission device in accordance with one embodiment of the present invention.
Figure 14:
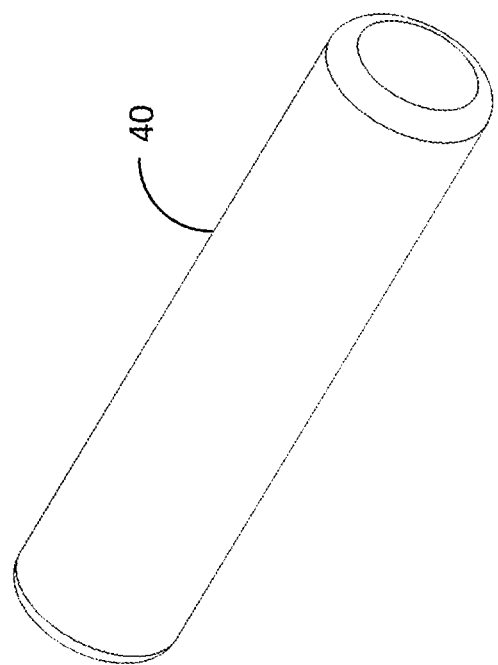
FIG. 14 is a perspective view of a pin utilized in a transmission device for a photosensitive drum in accordance with one embodiment of the present invention.

As such, the second end portion 829*b* of the bottom member 829 of each engagement block 82 is received in the respective opening 811*a*, the first end portion 829*a* of the bottom member 829 of each engagement block 82 is received in the respective groove 811*b*, and each engagement block 82 is rotatable around its pivotal axis, i.e., its corresponding pin 83. The engagement blocks 82 respectively extend helically from two opposite sides of the base 81, so that the engagement blocks 82 are located above and under the base 81, as shown in FIGS. 2A and 2B, and are arranged away from the drum axis L and toward the first direction D1. The pulling force exerts on the hooks 826 of the two engagement blocks 82 by the elastic ring 89 or 89' makes the engagement blocks 82 be positioned with each engagement claw 820 in an upright position as shown in FIGS. 6F and 10F in the normal state.

Furthermore, the transmission device comprising a transmission unit 20 also includes a sleeve 30, a gear member 60 and an elastic member 50.

Referring to FIGS. 2A, 2B, 11A to 11C, and 12A to 12B, and particularly to FIGS. 11A to 11C and 12A to 12B, the sleeve 30 includes a main body 32, an axial hole 322 penetrating through the main body 32 along the drum axis L, two guiding grooves 324 formed on the main body 32 and communicated with the axial hole 322, and two pillars 34 protruding from the main body 32. Only one of the guiding grooves 324 is shown in the figures, and the other guiding groove is located opposite to the groove 324 shown in the figures.

As shown in FIGS. 11A to 11C, each guiding groove 324 is in a shape of rectangle and has a bottom side substantially perpendicular to the drum axis L, two lateral sides respectively extending from two ends of the bottom side toward the first direction D1, and a top side connecting the two lateral sides and parallel to the bottom side. As shown in FIGS. 12A to 12B, the top side has a sloped portion and an extending portion parallel to the bottom side. It should be appreciated to one skilled in the art that other sleeves with various configurations may also be used to implement the present invention. For example, the sleeves according to other embodiment may include a plurality of guiding grooves having geometries different from those shown in FIGS. 11A to 11C and 12A to 12B, such as triangle, oval, circle, square, etc. provided that the pin 40 can move within the guiding groove to allow the transmission unit 20 to move along an axial direction and to rotate. When the transmission unit 20 is driven by the drive member of the electronic imaging device, the pin 40 will contact an edge of the guiding groove 324 of the sleeve 30 to transmit the rotation force to the gear member 60 through the sleeve 30.

According to the present invention, after assembling, the shaft 70 of the transmission unit 20 is disposed in the axial hole 322 and is capable of rotating about the drum axis L relative to the sleeve 30 and moving along the drum axis L relative to the sleeve 30. The pin 40 is inserted into the through hole 73 of the transmission unit 20 in a way that the shaft 70 of the transmission unit 20 has two protrusions 75 extending radially along the shaft 70, as shown in FIG. 2B. The two protrusions 75 are two parts of the pin 40 sticking out of the through hole 73 and are movably received in the guiding grooves 324 respectively.

It should be appreciated to one skilled in the art that the shaft 70 of the transmission unit 20 may also be provided without the through hole 73. For example, the shaft 70 of the transmission unit 20 may only have one protrusion 75 and the sleeve 30 may only be provided with one guiding groove 324. In addition, the protrusion 75 of the shaft 70 is not limited to be formed by the pin 40 inserted into the through hole 73. For example, the protrusion 75 may be protruded from the shaft body 74 integrally; in this situation, the guiding groove 324 should have an open end so that the protrusion 75 can enter the guiding groove 324 through the open end, and the open end of the guiding groove 324 may be capped by an annular cap provided at, but not limited to, the shaft 70.

Referring to FIGS. 2A, 2B and 13, the gear member 60 is adapted for engaging with the photosensitive drum and has a top portion 66, a gear portion 67 extending from the top portion 66 along the drum axis L toward the second direction D2, a bottom portion 68 extending from the gear portion 67 along the drum axis L toward the second direction D2, a top wall 64 located at one side of the top portion 66, and a bottom wall 65 located at one side of the bottom portion 68. In addition, the top portion 66 of the gear member 60 may have at least one slot 69. The peripheral configuration of the gear member 60 is similar to the conventional ones. The gear member 60 has a chamber 61 oriented along a longitudinal axis of the gear member 60 for receiving the main body 32 of the sleeve 30, so that the sleeve 30 is coupled with the gear member 60 in a way that the sleeve 30 cannot rotate around the drum axis L. In other embodiments, the sleeve 30 is molded in the gear member 60.

In other embodiments, the gear member 60 has an installation slot formed on the top wall 64, and two limiting recesses communicated with each other. The chamber 61 extends along the longitudinal axis and is open at the top wall 64. The installation slot extends from the chamber 61 toward the two opposite radial directions of the chamber 61 and is open at the top wall 64. The limiting recesses are located adjacent to the installation slot, extend parallel to the drum axis L, and are not open at the top wall 64. The sleeve 30 may further have two pillars 34 protruding from the main body 32. In assembly, the two pillars 34 of the sleeve 30 are inserted into the chamber 61 through the installation slot, and then the sleeve 30 is turned to cause the pillars 34 to enter the limiting recesses so that the sleeve 30 is limited in the gear member 60. The details of such embodiments are disclosed in the pending U.S. patent application Ser. Nos. 13/965,856, 14/310,615, 14/461,011 and 14/617,473, which are hereby incorporated herein in their entireties by reference, and not repeated herein.

According to the invention, the assembly process of the transmission device is very simple. As shown in FIG. 16A, first, the elastic member 50 is disposed in the axial hole 322 of the sleeve 30. The axial hole 322 of the sleeve 30 is in communication with the chamber 61 of the gear member 60. Then, the shaft 70 of the transmission unit 20 is inserted in the axial hole 322 of the sleeve 30, as shown in FIG. 16B. Next, the pin 40 is inserted into the opening 73 of the shaft 70 of the transmission unit 20 through the through slots 69 of the gear member 60 and the guiding grooves 324 of the sleeve 30, as shown in FIG. 16C. As such, the two end portions of the pin 40, i.e., the two protrusions 75, are movably disposed in the two guiding grooves 324 respectively, and two ends of the elastic member 50 are respectively abutted against the bottom wall 65 of the gear member 60 and the second end 72 of the shaft 70 of the transmission unit 20. The elastic force generated by the elastic member 50 exerts on the second end 72 of the shaft 70 of the transmission unit 20 along the drum axis L, so that the two end portions of the pin 40 of the shaft 70, i.e., the two protrusions 75, abut against the top sides or top ends of the guiding grooves 324 of the sleeve 30 when the transmission device 100 is in a normal state.

Figure 17:
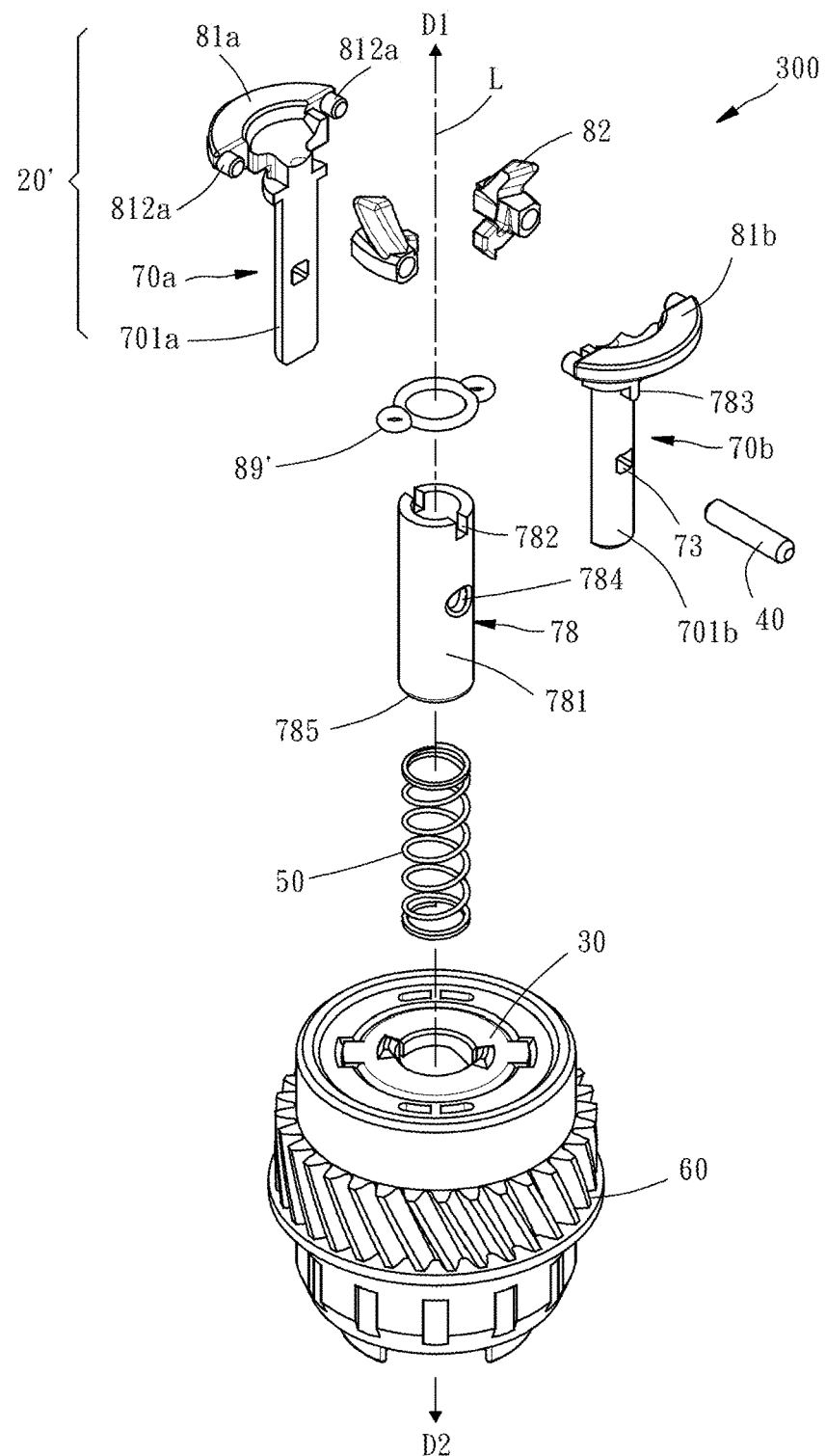
FIG. 17 is an exploded perspective view of a transmission device in accordance with one embodiment of the present invention.

FIG. 17 is another embodiment of a transmission device 300, which is essentially the same as the transmission device 200 shown in FIG. 2B, except that the transmission unit 20' of the transmission device 300 is different from the transmission unit 20 of the transmission device 200.

Referring to FIG. 17, the shaft 70, in this embodiment, comprises a first part 70a, a second part 70b, and a bushing 78. Each part 70a, 70b has a semi-cylindrical body 701a, 701b. The two semi-cylindrical bodies 701a, 701b have through holes 73 communicating with each other. The base 81 has two portions 81a and 81b respectively extending from one end of the respective semi-cylindrical body 701a, 701b. The semi-cylindrical bodies 701a and 701b of the first and second parts 70a and 70b are detachably attached to each other. The bushing 78 is disposed outside the semi-cylindrical bodies 701a and 701b of the first and second parts 70a and 70b. Specifically, the bushing 78 has a tubular body 781 disposed outside the bodies 701a and 701b of the first and second parts 70a and 70b. The tubular body 781 has two notches 782 formed on one end of the tubular body 781, two through holes 784 for insertion of the pin 40, and one bottom 785 formed on the other end of the tubular body 781. Each one of the bodies 701a and 701b of the first and second parts 70a and 70b is provided with a positioning block 783 adapted to be received in the respective notch 782, so that the bodies 701a and 701b of the first and second parts 70a and 70b cannot rotate relative to the bushing 78 when the bushing 78 is disposed outside the bodies 701a and 701b of the first and second parts 70a and 70b. In other embodiments, the shapes of the bodies 701a and 701b may be varied, for example, the cross-section of the body 701a/701b may be tetragon, polygon, etc., or alternatively, the volume of one of the bodies 701a and 701b may be three quarters of the total body and the volume of the other one of the bodies 701a and 701b may be one quarter of the total body. The structure or morphology of the bushing 78 may be varied in the condition that the bushing 78 must be able to dispose outside the bodies 701a and 701b of the first and second parts 70a and 70b, for example, the bottom 785 or the two notches 782 may be omitted, or alternatively, the positions of the two notches 782 and the positions of the two positioning blocks 783 may be exchanged with each other.

Figures 18A, 18B:
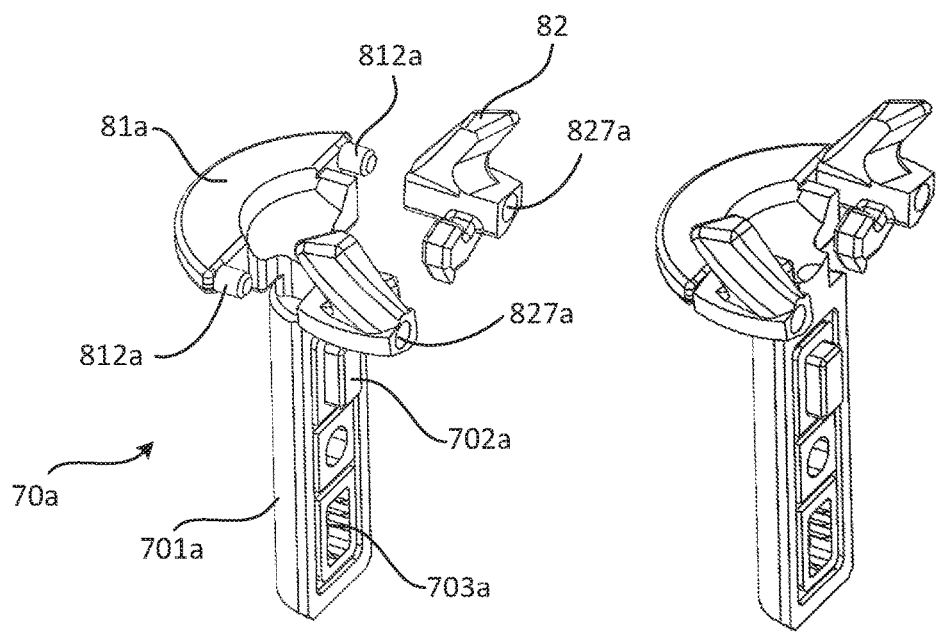
FIGS. 18A to 18D are schematic views showing an assembly process of a transmission unit in accordance with one embodiment of the present invention.
Figures 18C, 18D:
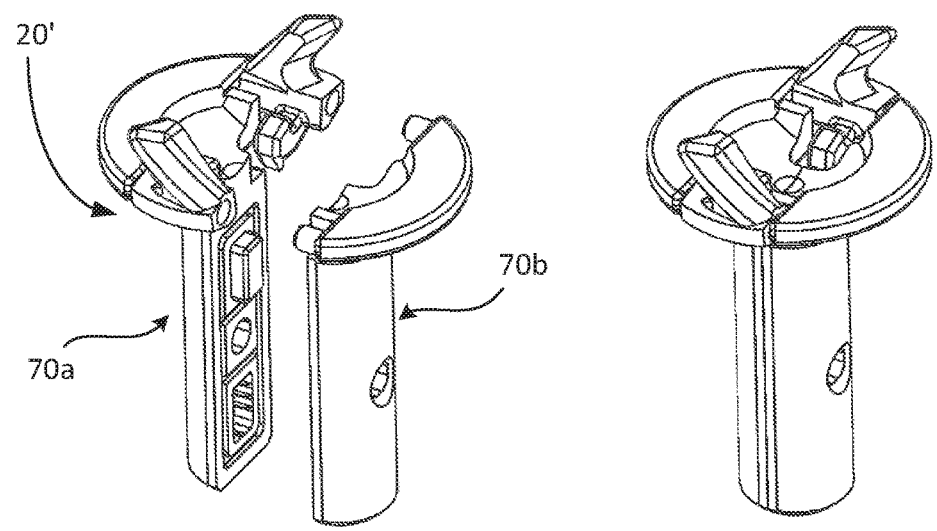
Figure 20A:
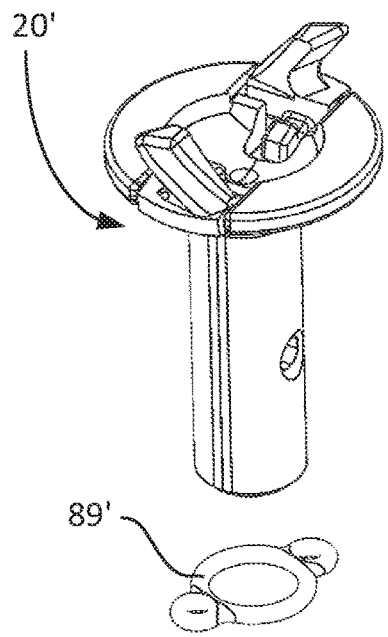
FIGS. 20A to 20D are schematic views showing an assembly process of a transmission unit with a holding member in accordance with one embodiment of the present invention.
Figure 20B:
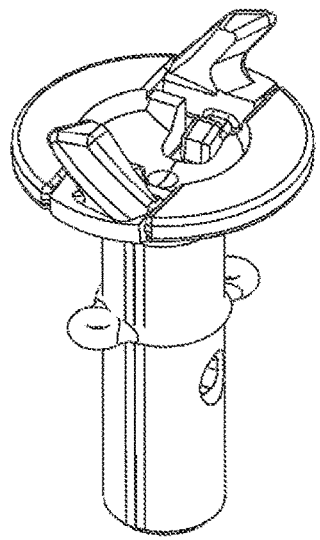
Figure 20C:
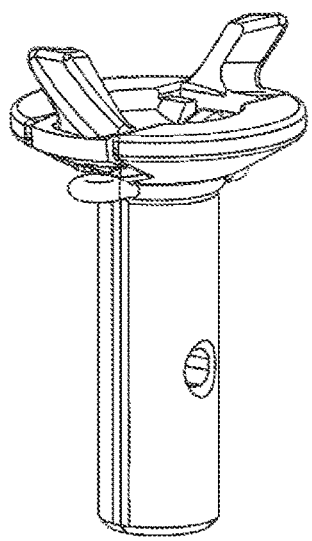
Figure 20D:
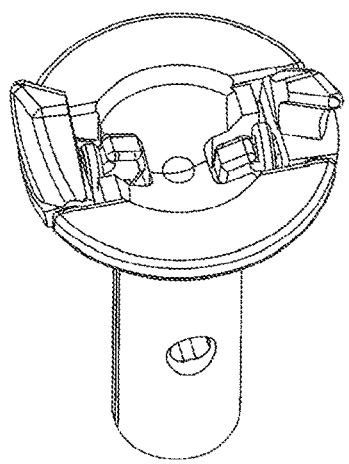

In other embodiment, as shown in FIG. 18, each semi-cylindrical body 701a/701b has an elongated plane surface parallel to the drum axis L, at least one protrusion 702a protruding from the elongated plane surface, and at least one recess 703a recessed from the elongated plane surface. As such, when assembled, the at least one protrusion 702a of the semi-cylindrical body 701a of the first part 70a is received in the at least one recess 703b of the semi-cylindrical body 701b of the second part 70b, and the at least one protrusion 702b of the semi-cylindrical body 701b of the second part 70b is received in the at least one recess 703a of the semi-cylindrical body 701a of the first part 70a. In other words, the semi-cylindrical bodies 701a and 701b of the first and second parts 70a and 70b of the shaft 70 can be detachably snapped to each other.

In an alternative embodiment, different shapes for the protrusions and recesses (for example, circular, triangular, etc.) and/or a different number of protrusions or recesses (for example, one, three, etc.) can be used to detachably snap fit the semi-cylindrical bodies 701a and 701b of the first and second parts 70a and 70b of the shaft 70. Alternatively, the protrusions and recesses can be sized to detachably couple the semi-cylindrical bodies 701a and 701b through a friction fit.

In this embodiment, the base 81 has two base portions 81a/81b. Each base portion 81a/81b has two pins 812a respectively extending toward the at least two recesses 811, such that each pin 812a is coincident with the pivotal axis while assembled.

In this embodiment, each engagement block 82 is essentially the same as that shown in FIG. 8, except that two holes 827a, instead of the through hole, are oppositely provided in the bottom member. As such, when assembled, the pins 812a of the base portions 81a and 81b are received in the two holes 827a of the engagement blocks 82. Accordingly, each engagement block 82 is rotatable around the pivotal axis at the second end portion 829b of the bottom member 829.

FIG. 19 shows another embodiment of a transmission unit 20", which is essentially the same as the transmission unit 20' shown in FIG. 18, except that the base portions and engagement blocks utilized in the transmission unit 20" are different from that of the transmission unit 20'. In this embodiment, each base portion 81'a/81'b has two holes 812'a respectively facing the at least two recesses 811, such that each hole 812'a is coincident with the pivotal axis while assembled. In addition, each engagement block 82' has two pins 827'a oppositely protruding from its bottom member. As such, when assembled, the two pins 827'a of each engagement block 82' are received in the corresponding holes 812'a of the base portions 81'a and 81'b. Accordingly, each engagement block 82' is rotatable around the pivotal axis.

FIG. 20 shows an assembly process of the transmission unit 20' (or 20") with a holding member 89' according to one embodiment of the present invention, which is the same as that shown in FIG. 9. In this embodiment, the elastic ring 89' comprises two ear rings formed on the two opposite sides of the elastic ring 89'. As such, the hooks 826 of the bottom members 829 of the two engagement blocks 82 are hooked by the ear rings 891 of the elastic ring 89'. Alternatively, a spring may be used to connect the hooks 826 of the bottom members 829 of the two engagement blocks 82.

Figure 21A:
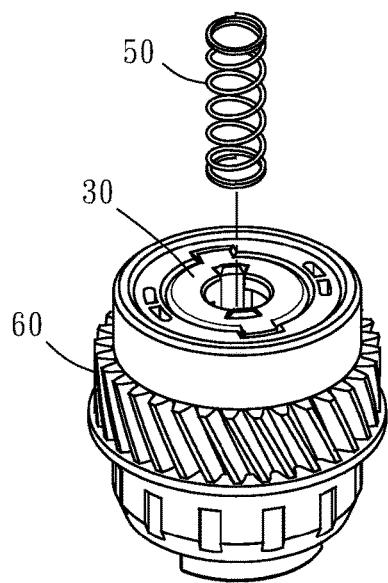
FIGS. 21A to 21C are schematic views showing an assembly process of a transmission device in accordance with one embodiment of the present invention.
Figure 21B:
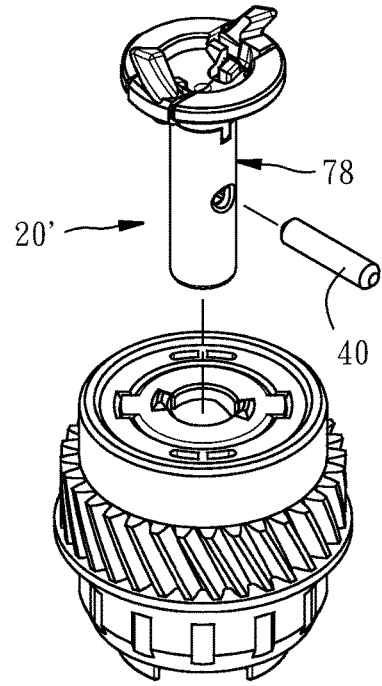
Figure 21C:
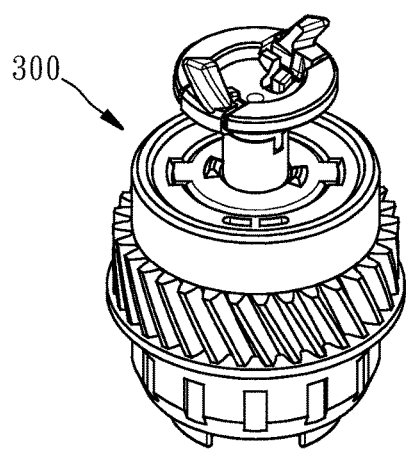

FIG. 21 shows an assembly process of the transmission device 300. At first, the elastic member 50 is disposed in the axial hole 322 of the sleeve 30, as shown in FIG. 21A. The axial hole 322 of the sleeve 30 is in communication with the chamber 61 of the gear member (housing) 60. Then, the first part 70a, the second part 70b, and the two engagement blocks 82 are connected together, and the bushing 78 is disposed outside the bodies 701a, 701b of the first and second parts 70a, 70b. Because the two positioning blocks 783 are respectively received in the two notches 782 and the bottom edges of the two bodies 701a, 701b are abutted against the bottom 785 of the bushing 78, the bodies 701a, 701b of the first and second parts 70a, 70b cannot rotate and axially move relative to the bushing 78. That is to say, the first part 70a and the second part 70b are limited by the bushing 78. Next, as shown in FIG. 21B, the pin 40 passes through the two through holes 784 and the through hole 73 of the shaft 70 of the transmission unit 20'. The shaft 70 of the transmission unit 20' is then inserted in the axial hole 322 of the sleeve 30, as shown in FIG. 21C. As such, the two end portions of the pin 40 are movably received in the two guiding grooves 324, and two ends of the elastic member 50 are abutted against the bottom wall 65 of the gear member 60 and the second end 72 of the shaft 70 of the transmission unit 20', respectively. The elastic force generated by the elastic member 50 exerts on the second end 72 of the shaft 70 of the transmission unit 20' along the drum axis L, so that the two end portions of the pin 40 of the shaft 70 abut against the top sides or top ends of the guiding grooves 324 of the sleeve 30 when the transmission device 300 is in a normal state. Because the first part 70a and the second part 70b can be connected firmly by the bushing 78, the first part 70a and the second part 70b are not easy to separate apart while the transmission device 300 is driven to rotate, resulting in that the transmission device 300 has a structure stronger than the prior art.

In an alternative embodiment, the pin 40 may be replaced with two protrusions 75 respectively integrally extending from each semi-cylindrical body 701a/701b. Such protrusion 75 can be molded with each semi-cylindrical body 701a/701b.

Figure 22:
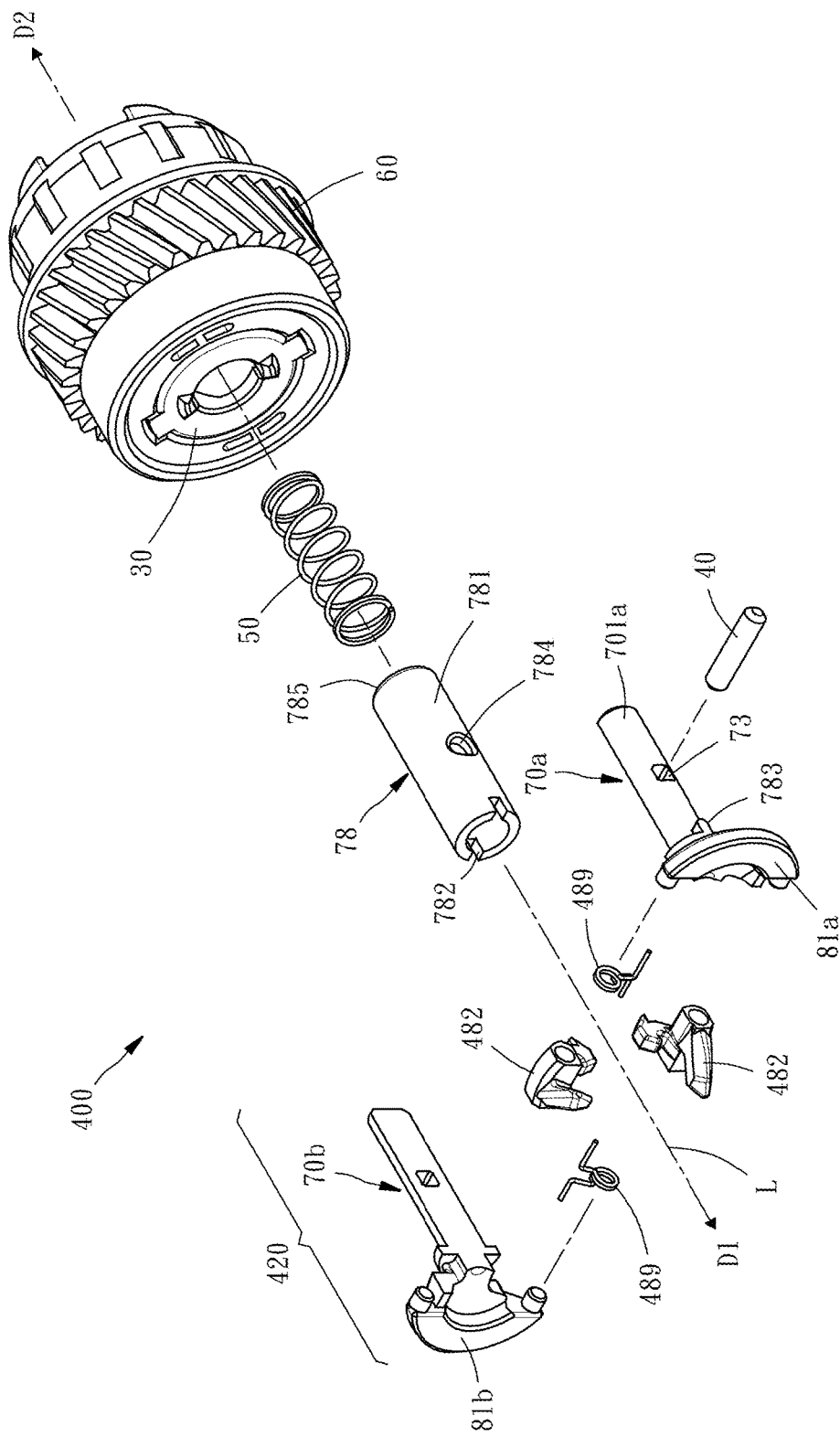
FIG. 22 is an exploded perspective view of a transmission device in accordance with another embodiment of the present invention.
Figure 23A:
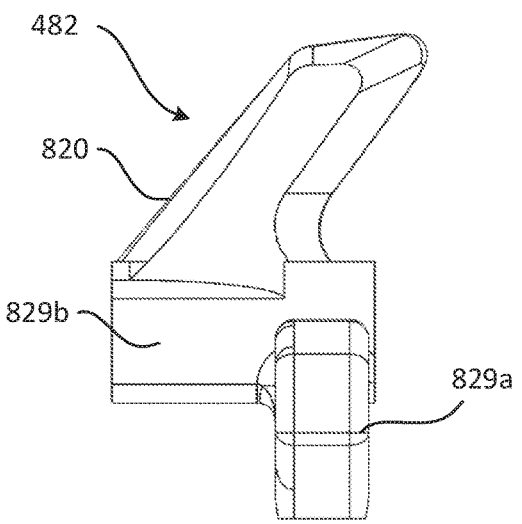
FIGS. 23A to 23D are different views of an engagement block of a transmission unit utilized in a transmission device in accordance with one embodiment of the present invention.
Figure 23B:
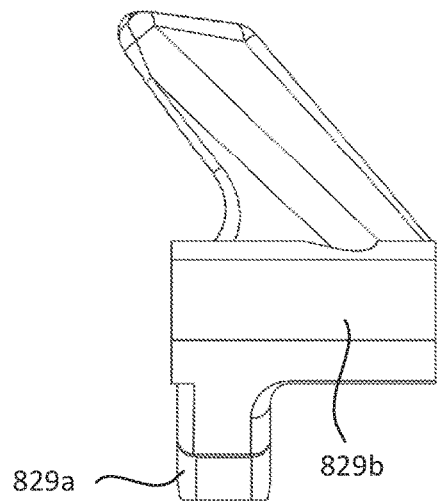
Figure 23C:
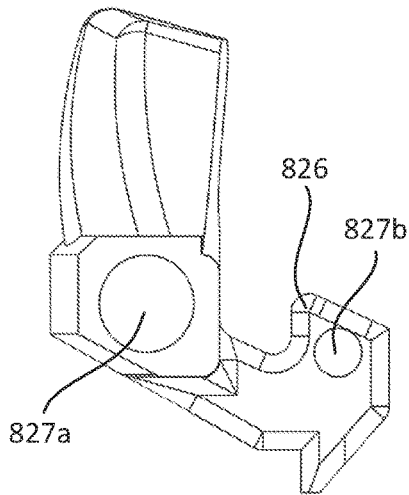
Figure 23D:
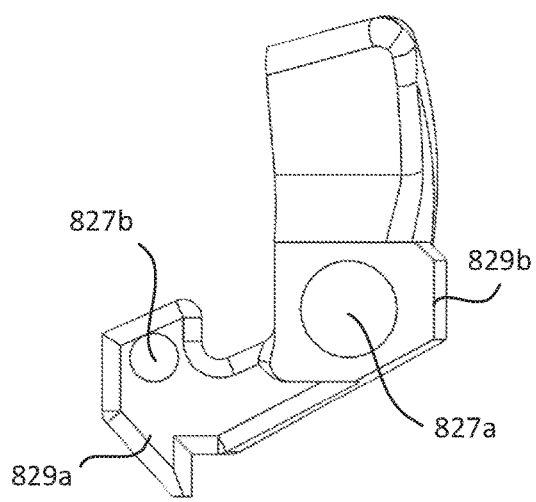

FIG. 22 shows one embodiment of a transmission device 400, which is essentially the same as the transmission device 300 shown in FIG. 17, except that the transmission unit 420 of the transmission device 400 is different from the transmission unit 20' of the transmission device 300. As shown in FIG. 22, the transmission unit 420 includes the shaft, the base, the bushing, the two engagement blocks, and two springs, such as elastic bias members.

Referring to FIG. 22, the shaft in this embodiment is the same as the shaft 70 shown in FIG. 17, which comprises a first part 70a and a second part 70b. The first part 70a and the second part 70b respectively include a semi-cylindrical body 701a and 701b detachably attached to each other. In other embodiment, as shown in FIGS. 25 to 26, each semi-cylindrical body 701a/701b may have an elongated plane surface parallel to the drum axis L, at least one protrusion 702a protruding from the elongated plane surface, and at least one recess 703a recessed from the elongated plane surface. As such, when assembled, the at least one protrusion 702a of the semi-cylindrical body 701a of the first part 70a is received in the at least one recess 703b of the semi-cylindrical body 701b of the second part 70b, and the at least one protrusion 702b of the semi-cylindrical body 701b of the second part 70b is received in the at least one recess 703a of the semi-cylindrical body 701a of the first part 70a. In other words, the semi-cylindrical bodies 701a and 701b of the first and second parts 70a and 70b of the shaft 70 can be detachably snapped to each other.

In an alternative embodiment, different shapes for the protrusions and recesses (for example, circular, triangular, etc.) and/or a different number of protrusions or recesses (one, three, etc.) can be used to detachably snap fit the semi-cylindrical bodies 701a and 701b of the first and second parts 70a and 70b of the shaft 70. Alternatively, the protrusions and recesses can be sized to detachably couple the semi-cylindrical bodies 701a and 701b through a friction fit.

The base 481 of the embodiment shown in FIGS. 22, 25 and 26 is essentially the same as that the base 81 shown in FIG. 17, which also has two portions 81a and 81b, each base portion 81a/81b extending from one end of the respective semi-cylindrical body 701a/701b. Each base portion 81a/81b has two pins 812a respectively extending toward the at least two recesses 811, such that each pin 812a is coincident with the pivotal axis while assembled. Besides, each base portion 81a/81b also has a first bore (or hole) 813 adjacent to the end of the respective semi-cylindrical body 701a/701b, and a second bore 814 facing one recess 811 and close to one pin 812a.

In the embodiment shown in FIGS. 22 and 23, each engagement block 482 is essentially the same as that shown in FIG. 8, except that the two holes 827a are oppositely provided in the second end portion 829b of the bottom member 829, and each engagement block 482 also has another hole 827b provided in the first end portion 829a of the bottom member 829.

Figure 24B:
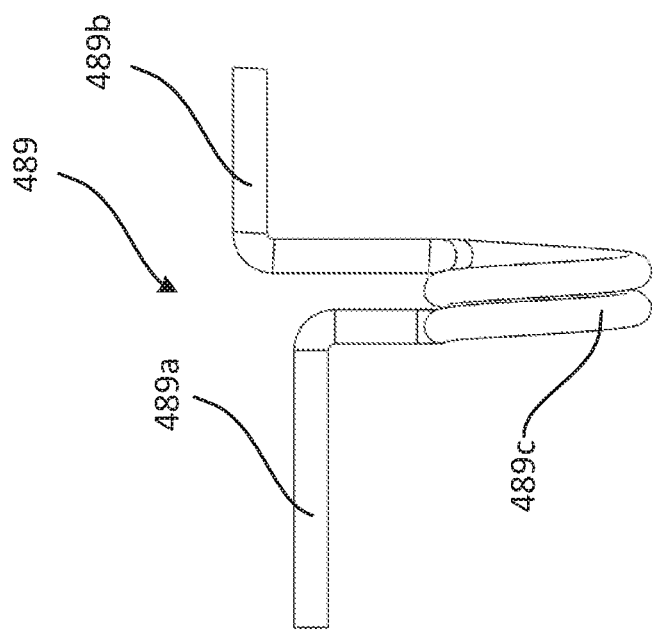
FIGS. 24A to 24B are different views of an elastic bias member of a transmission unit utilized in a transmission device in accordance with one embodiment of the present invention.
Figure 24A:
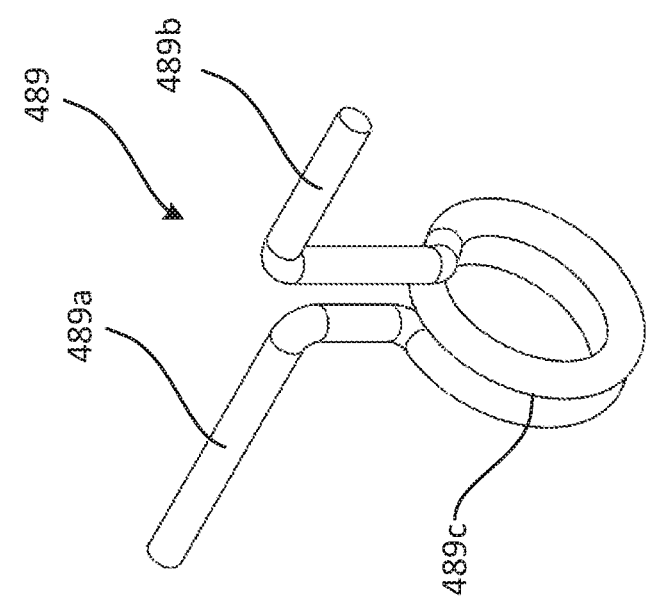

As shown in FIGS. 22 and 24, in one embodiment, each elastic bias member 489 has a first end portion 489a, an opposite second end portion 489b, and a middle portion 489c located between the first and second end portions 489a and 489b. In this embodiment, the elastic bias member 489 is a bias spring. The middle portion 489c of the elastic bias member 489 is shaped as a coil. The elastic bias member 489 is used for holding a corresponding engagement block 482 in a normal state during a normal operation of a photosensitive drum, and providing bias forces against the rotation of the corresponding engagement block during the connection of the transmission device 400 to or the separation of the transmission device 400 from a drive member. The elastic bias member 489 has essentially the same function as that of the elastic member 89 or 89' utilized in the transmission device 100, 200 or 300 shown in FIGS. 2A, 2B and 17. It should be appreciated to one skilled in the art that other types of the elastic bias members may also be used to implement the present invention.

Figure 28B:
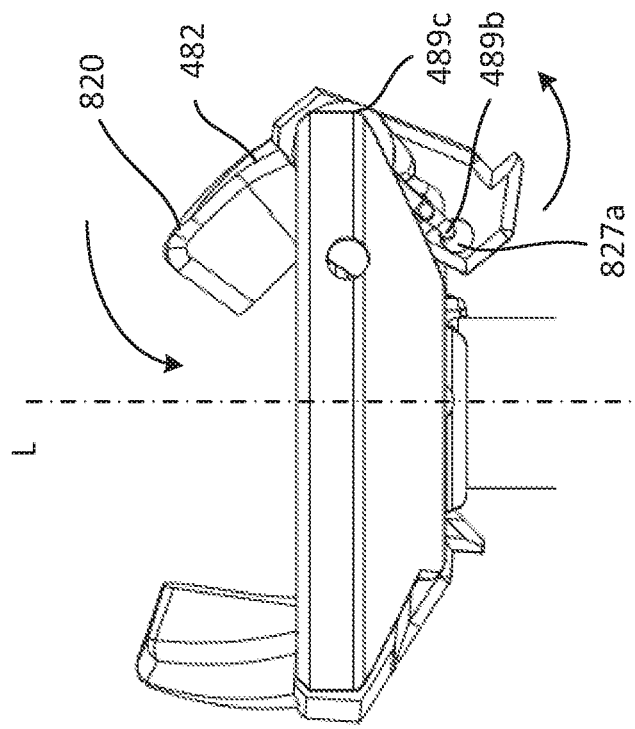
FIGS. 28A to 28B are different schematic views of a part of a transmission unit utilized in a transmission device in accordance with one embodiment of the present invention.
Figure 28A:
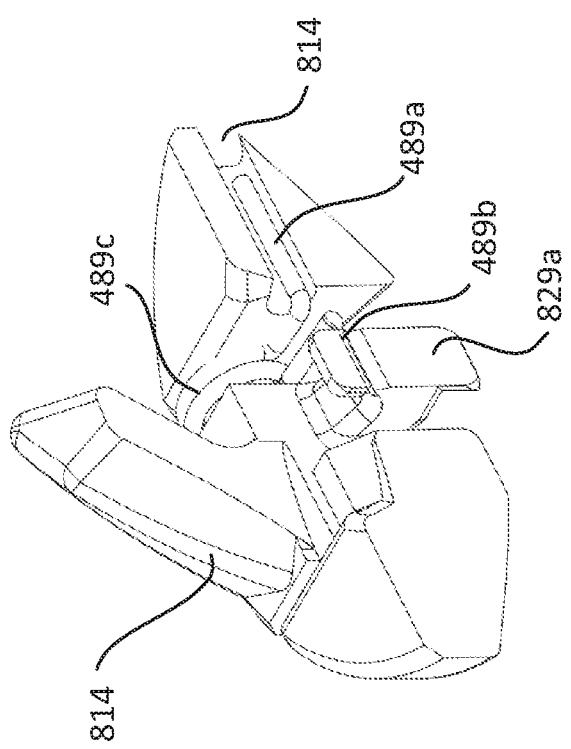

When assembled, the first end portion 489a of the elastic bias member 489 is inserted into the second bore 814 of the corresponding base portion 81a (or 81b), and meanwhile, the middle portion 489c of the elastic bias member 489 is provided surrounding the pin 812a of the corresponding base portion 81a (or 81b). Next, the second portion 489b of the elastic bias member 489 is inserted into the hole 827a of a corresponding engagement block 482, and meanwhile, the pin 812a of the corresponding base portion 81a (or 81b) is received in the corresponding hole 827b of the engagement block 482, as shown in FIGS. 26 to 28. Furthermore, a pin 488 is inserted into the first bore 813 for connecting the base portion and the engagement block. Accordingly, the two engagement blocks can be detachably attached or snapped to each other, as discussed above.

Figure 29:
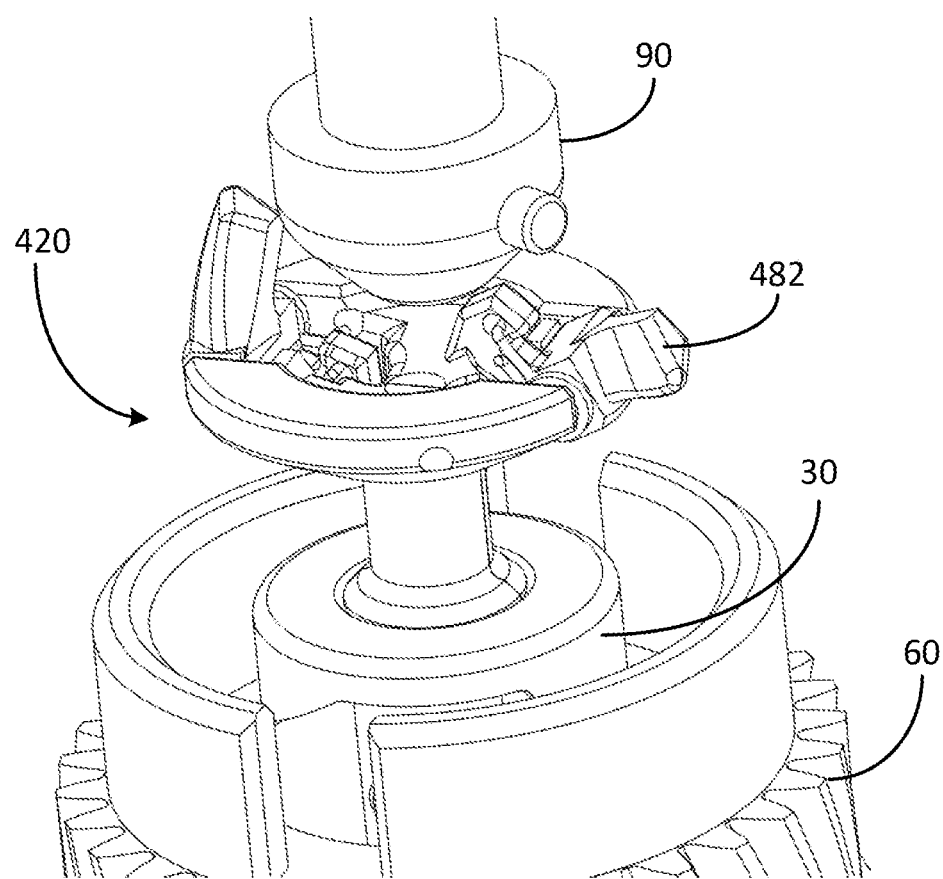
FIG. 29 is a schematic view showing a transmission device for a drum unit in a position for separating from a drive member in accordance with one embodiment of the present invention.

As such, each engagement block 82 is rotatable around the pivotal axis at the second end portion 829b of the bottom member 829. The pivotal axis is particularly coaxial to the pin 812a of the corresponding base portion 81a (or 81b), the middle portion 489c of the elastic bias member 489, and the corresponding hole 827a of the engagement block 482. The elastic bias member 489 provides a bias force to hold the engagement block 482 in the normal state during the normal operation of a photosensitive drum, and provides bias force against the rotation of the engagement block 482 during the connection of the transmission device 400 to or the separation of the transmission device 400 from a drive member. For example, during a process of connecting the transmission device 400 to a drive member, the engagement claw 820 of one engagement block 482 rotates toward the drum axis L, while the bottom member 829 of the engagement block 482 rotates away from the drum axis L, as shown in FIG. 28B. Such a rotation of the engagement block 482 causes the bias spring 489 to generate a bias force against the rotation, so as to ensure the engagement block 482 not to be over-rotated during the connecting process and force the engagement block 482 back to the normal state after the connecting process is done. During a process of separating the transmission device 400 with the drive member, the engagement claw 820 of one engagement block 482 rotates away from the drum axis L, while the bottom member 829 of the engagement block 482 rotates toward the drum axis L, as shown in FIG. 29. Similarly, such a rotation of the engagement block 482 causes the bias spring 489 to generate a bias force against the rotation, so as to ensure the engagement block 482 not to be over-rotated during the separating process and force the engagement block 482 back to the normal state after the separating process is done.

It should be appreciated to one skilled in the art that other configurations of the engagement block may also be used to implement the present invention. For example, the pin 812a of the base portion 81a (or 81b) may be replaced with a bore, while the corresponding hole 827a of the engagement block 482 may be replaced with a pin, which is similar to the structure shown in FIG. 19. In the case, when assembled, the middle portion 489c of the elastic bias member 489 is provided surrounding a corresponding pin of an engagement block.

Figure 30:
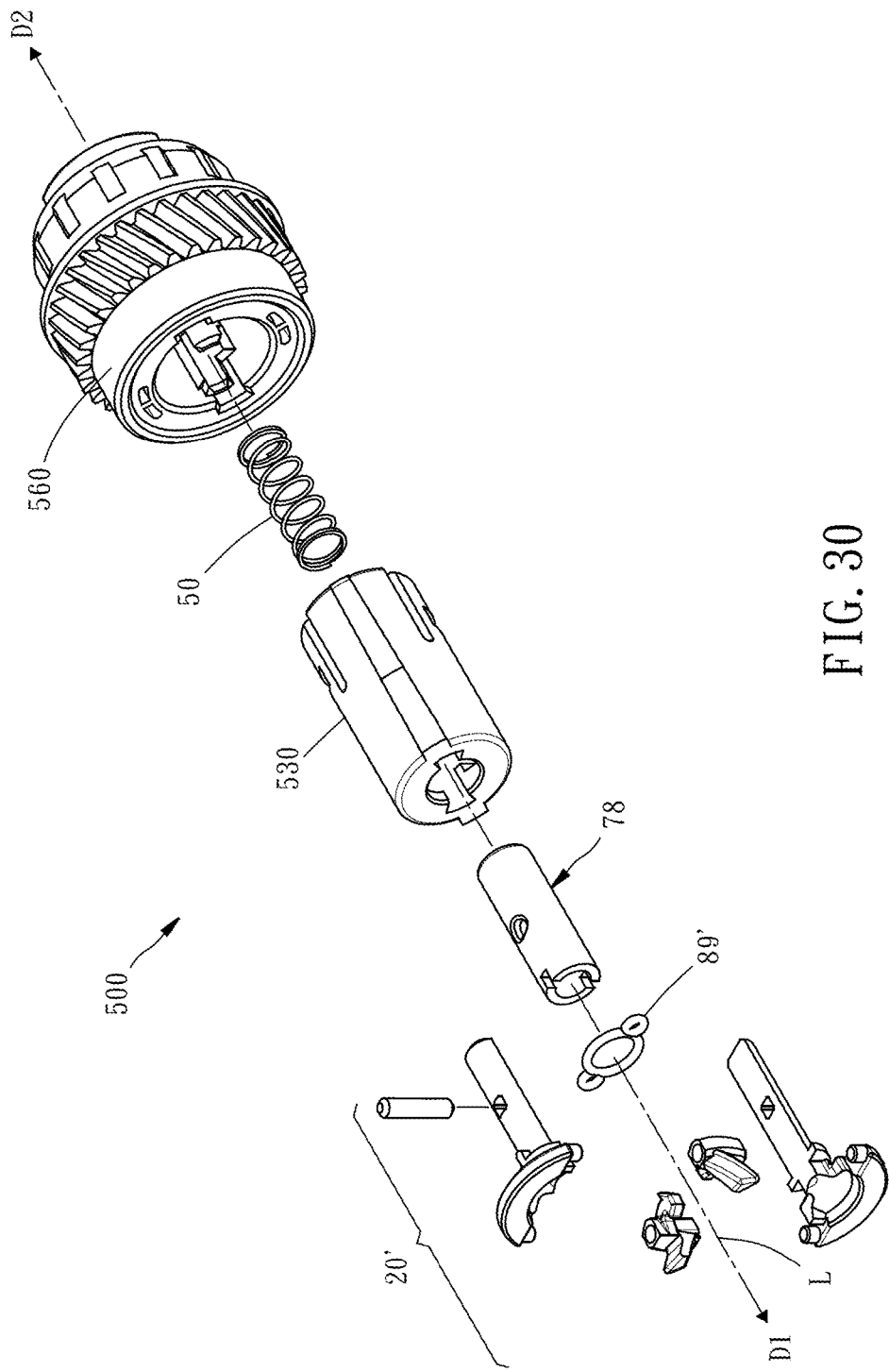
FIG. 30 is an exploded perspective view of a transmission device in accordance with yet another embodiment of the present invention.
Figure 31A:
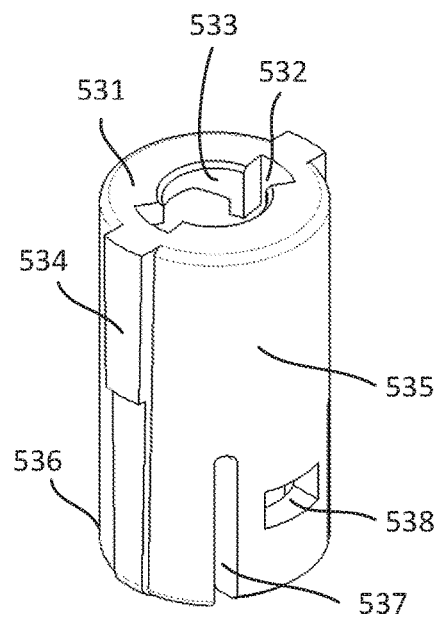
FIGS. 31A, 31B, 31C and 31D are respectively a perspective view, another perspective view, a top view and a bottom view of a sleeve utilized in a transmission device for a drum unit in accordance with one embodiment of the present invention.
Figure 31B:
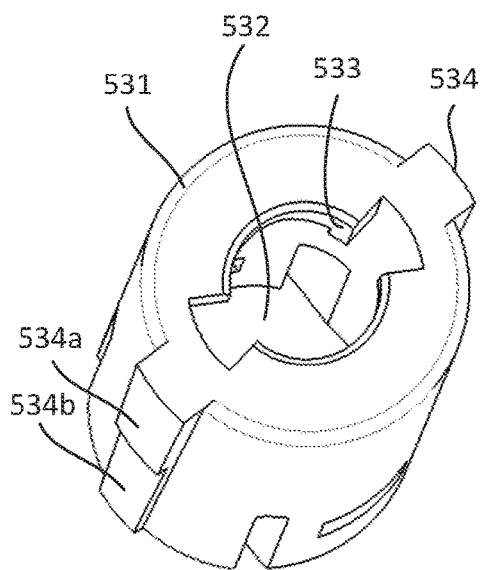
Figure 31C:
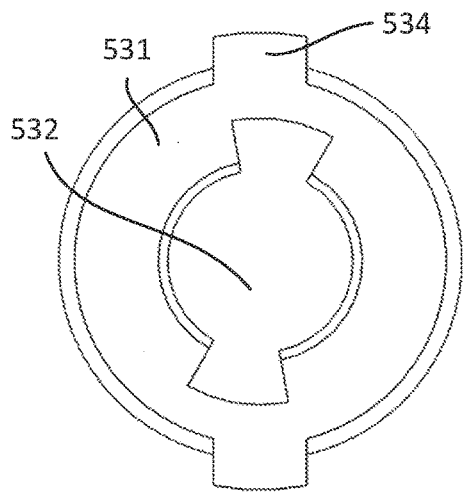
Figure 31D:
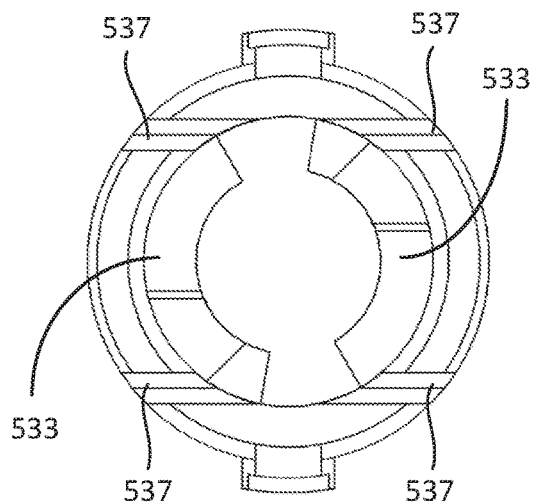
Figure 32A:
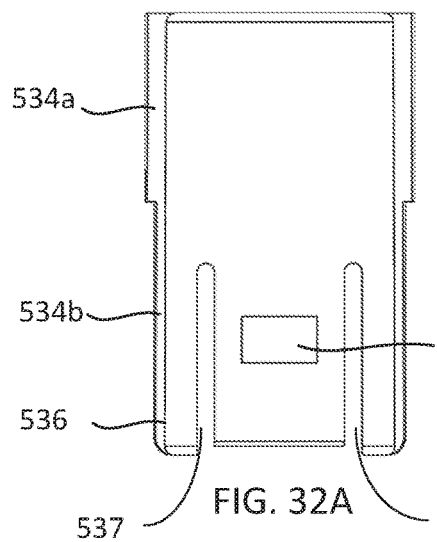
FIGS. 32A to 32B and 32C to 32D are respectively side views and cross-sectional views of the sleeve shown in FIG. 31.
Figure 32B:
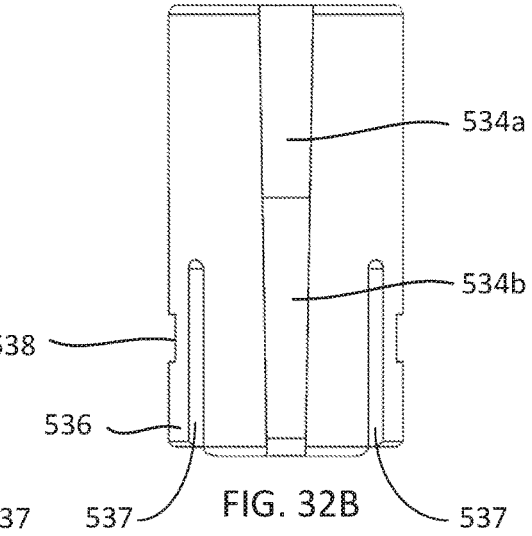
Figure 32C:
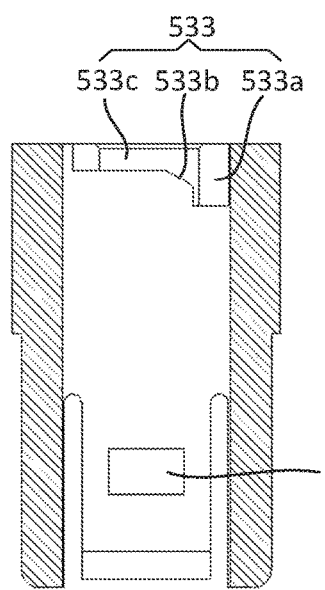
Figure 32D:
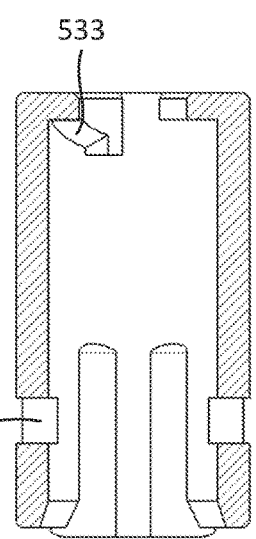

FIG. 30 shows another embodiment of a transmission device 500, which includes a transmission unit 20', a holding member 89', a bushing 78, a sleeve 530, an elastic member 50, and a housing (gear member) 560. The details of the transmission unit 20', the holding member 89', and the elastic member 50 are discussed in the foregoing sections and are not repeated here. The housing 560 is detachably attached to the photosensitive drum and coaxial to the drum axis L. The sleeve 530 is coupled with the housing 560 and coaxial to the drum axis L, such that the housing 560 and the sleeve 530 define at least one guiding groove therebetween.

In the embodiment shown in FIGS. 31 and 32, the sleeve 530 includes a top wall 531, a side wall 535 extending axially along a longitudinal axis of the sleeve 530 from the top wall 531, and two retention members 533 formed in the top wall 531. Each retention member 533 has a first portion 533a, a second portion 533b extending radially from the first portion 533a and having a sloped profile, and a third portion 533c extending radially from the second portion 533b, as shown in FIG. 32C. The configuration of the retention member 533 may be varied. The sleeve 530 further has a slot 532 provided on the top wall 531 and sized to allow a protrusion 75 of the shaft 70 of the transmission unit 20 to pass therethrough while the transmission unit 20 is assembled with the sleeve 530. Further, the sleeve 530 includes two flanges 534 protruding outwardly from the two opposite sides of the side wall 535 along the drum axis L. In this embodiment, each one of the flanges 534 includes a first portion 534a and a second portion 534b thinner than the first portion 534a. In addition, the sleeve 530 has two through grooves 538 provided in the bottom portion of the side wall 535 and located between the two flanges 534. The bottom portion of the side wall 535 may also have one or more through cuts 537.

As shown in FIGS. 33 and 34, in this embodiment, the housing 560 comprises a bottom 565, a top 564, an inner wall 566, a chamber 561 defined by the inner wall 566 and oriented along a longitudinal axis of the housing 560, a baffle wall 562 extending axially from the bottom 565 in the chamber 561, and two baffle tabs 563 extending axially from the baffle wall 562 toward the top 564 in the chamber 561, such that a gap 569 is defined between the baffle wall 562, the baffle tabs 563, and the inner wall 566. The two baffle tabs 563 are oppositely positioned. Each baffle tab 563 has stepwise top portions 563a and 563b. The baffle wall 562 has two protrusions 568 extending into the gap 569. Preferably, the two protrusions 568 are oppositely located, and each protrusion 568 is located between the baffle tabs 563. In addition, the housing 560 also has two slots 567 formed oppositely on the inner wall 566.

In such a design, when the sleeve 530 is assembled to the housing 560, the two flanges 534 are respectively received in the two slots 567 of the housing 560, the side wall 535 of the sleeve 530 is located in the gap 569 of the housing 560, and the two protrusions 568 of the baffle walls 562 are respectively received in the two grooves 538 of the sleeve 530. Accordingly, the sleeve 530 is securely attached to the housing 560 so that a rotation of the sleeve 530 drives a rotation of the housing 560 simultaneously.

Further, the first portion 533a of each retention member 533 is poisoned in the lower portion 563b of a corresponding baffle tab 563 and is in substantially contact with the side of the portion 563a of the baffle tab 563, while the third portion 533c of the retention member 533 is in substantially contact with the side of the portion 563b of the baffle tab 563, such that each retention member 533 of the sleeve 530 and the baffle wall 562 and the two baffle tab 563 of the housing 560 define a guiding groove 5324, as shown in FIGS. 37E and 37F. In this embodiment, two guiding grooves 5324 are respectively oppositely formed on two sides of the sleeve 530 and the housing 560, where only one guiding groove 5324 is shown in FIGS. 37E and 37F. The guiding grooves 5324 defined by the sleeve 530 and the housing 560 in this embodiment are structurally and functionally similar to the guiding groove 324 defined by the sleeve 30 in the other embodiments as shown in FIGS. 11 and 12, 37 B and 37C.

Figure 35A:
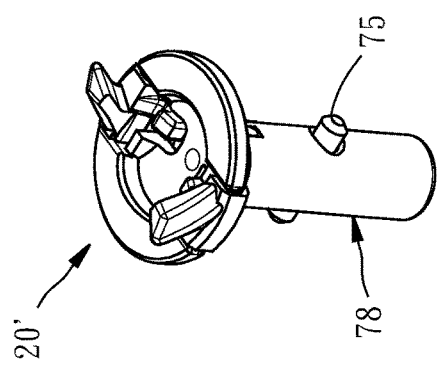
FIGS. 35A to 35C and 36A to 36D are schematic views showing an assembly process of a transmission unit utilized in a transmission device in accordance with another embodiment of the present invention.
Figure 35B:
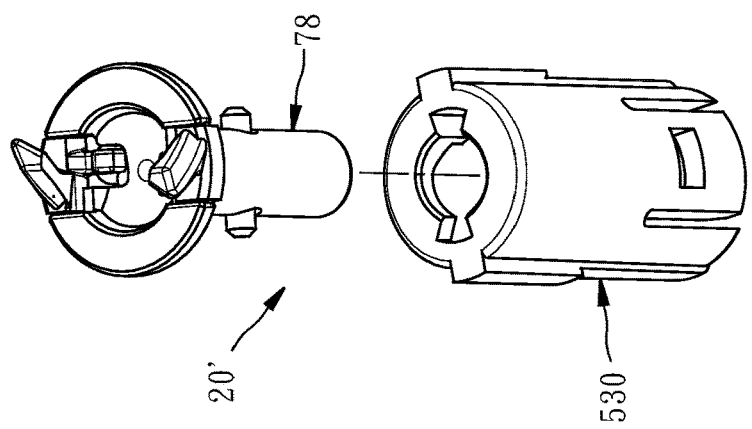
Figure 35C:
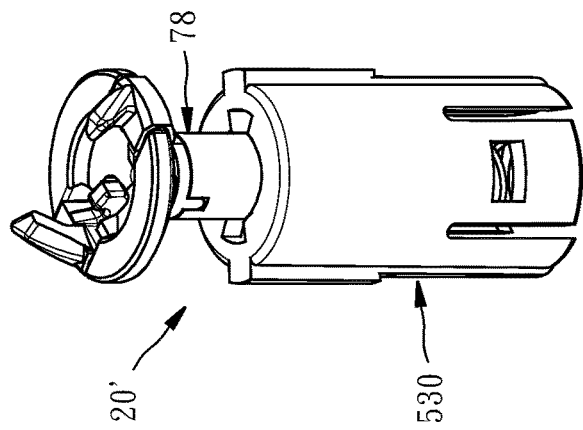
Figures 36A, 36B:
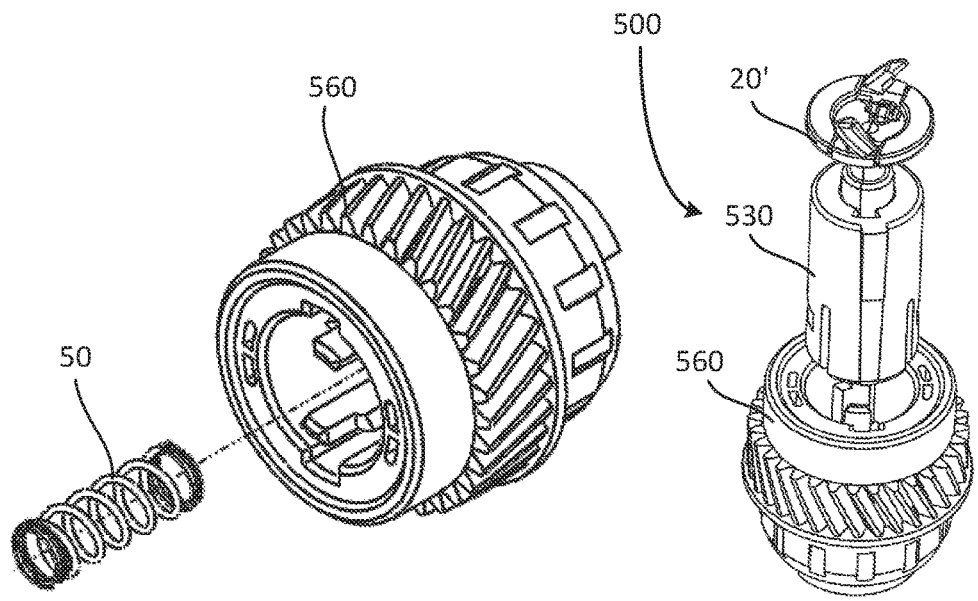
Figures 36C, 36D:
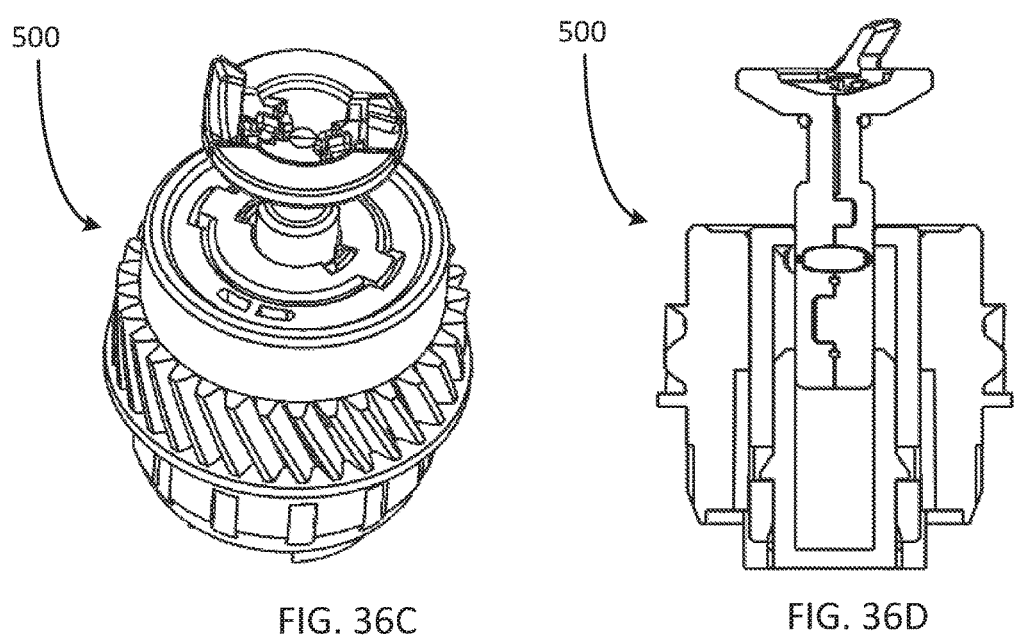
Figure 38A:
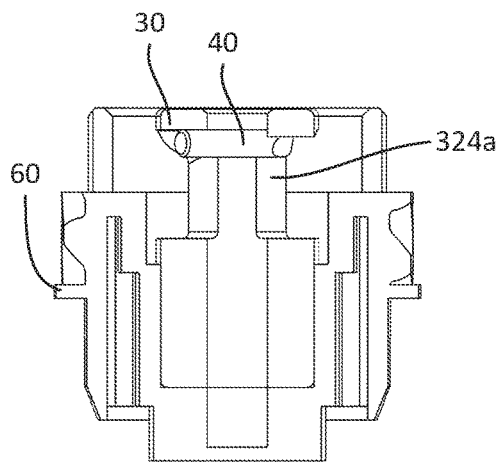
FIGS. 38A and 38B and FIGS. 38C and 38D are respectively a cross-sectional view and perspective cross-sectional views of assembled sleeves and housings of transmission devices shown in FIG. 37.
Figure 38B:
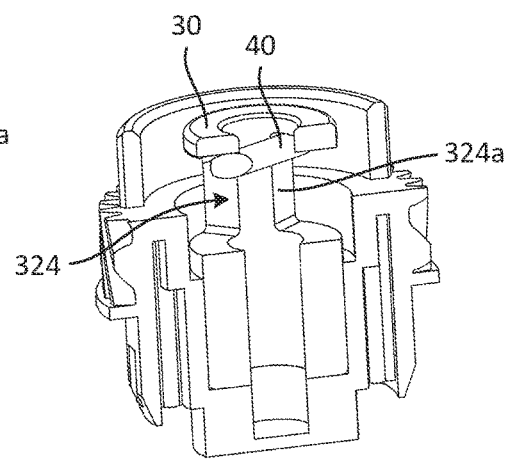
Figure 38C:
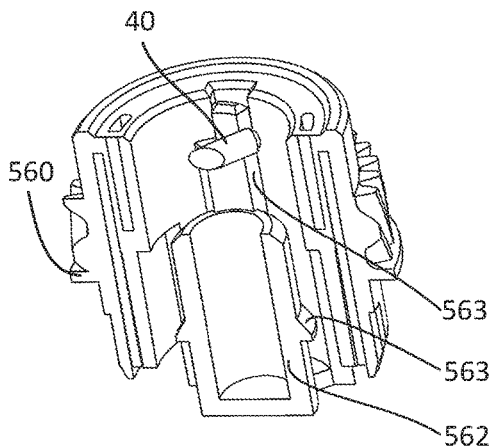
Figure 38D:
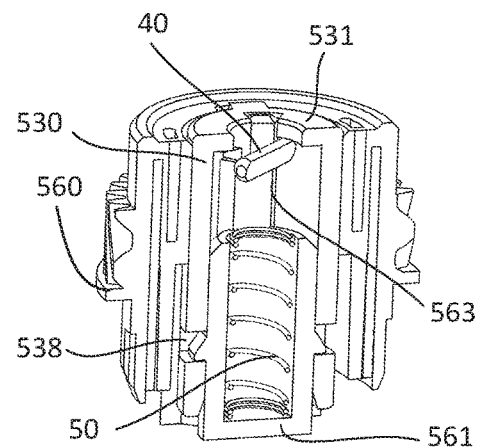

FIGS. 35 and 36 show an assembly process of the transmission device 500. At first, the first part 70a and the second part 70b of the shaft 70 are connected with the two engagement blocks 82. The bushing 78 is disposed outside the bodies 701a, 701b of the first part 70a and the second part 70b. The pin 40 is then inserted through the two through holes 784 of the bushing 78 and the through hole 73 of the shaft 70 of the transmission unit 20', as shown in FIG. 35A. As shown in FIG. 35B, the shaft 70 of the transmission unit 20' is disposed to the sleeve 530 coaxially to the drum axis L. Specifically, the transmission unit 20' is inserted into the sleeve 530 through the slot 532 and rotated clockwise or counterclockwise so that the two end portions of the pin 40, i.e. the protrusions 75, is located under the retention members 533, as shown in FIG. 35C. Then, the elastic member 50 is disposed inside the baffle wall 562 of the housing 560, as shown in FIG. 36A. Next, the assembled sleeve and transmission unit (shown in FIG. 35C) is placed into the chamber 561 of the housing 560 in a way that the two flanges 534 are respectively received in the two slots 567 of the housing 560, the side wall 535 of the sleeve 530 is received in the gap 569 of the housing 560, and the two protrusions 568 of the baffle walls 562 are respectively received in the two through grooves 538 of the sleeve 530, such that each retention member 533 of the sleeve 530 and the baffle wall 562 and the two baffle tabs 563 of the housing 560 define a corresponding guiding groove 5324. As such, the shaft 70 of the transmission unit 20' is rotatable about the drum axis L relative to the sleeve 530 and is movable along the drum axis L relative to the sleeve 530, where a rotation range and a moving range of the shaft 70 in relation to the sleeve 530 are determined by the guiding grooves 5324. Particularly, the two protrusions 75 of the pin 40 of the shaft 70 are received and movably limited in the guiding grooves 5324, and two ends of the elastic member 50 are respectively abutted against the bottom wall of the gear member 560 and the second end of the shaft 70 of the transmission unit 20'. The force thus generated by the elastic member 50 exerts on the second end of the shaft 70 of the transmission unit 20' along the drum axis L, so that the two end portions of the pin 40 of the shaft 70 (two protrusions 75) abut against the top sides or top ends of the guiding grooves 5324 of the sleeve 530 in a normal state of the transmission device 500. When the shaft 70 rotates to a position where the two end portions of the pin 40 (i.e. protrusions 75) of the shaft 70 is in contact with a side wall of the guiding grooves 5324, as shown in FIGS. 38C and 38D, further rotation of the shaft 70 drives the sleeve 530 to rotate, which in turn, drives the housing 560 to rotate, thereby driving the transmission device 500. The operation is similar to the operation of a transmission device shown in FIGS. 38A and 38B, which is corresponding to the transmission device 100, 200, 300, 400 discussed above.

In an alternative embodiment, the pin 40 may be replaced with two protrusions 75 respectively integrally extending from each semi-cylindrical body 701a/701b. Such protrusion 75 can be molded with each semi-cylindrical body 701a/701b.

Figure 39:
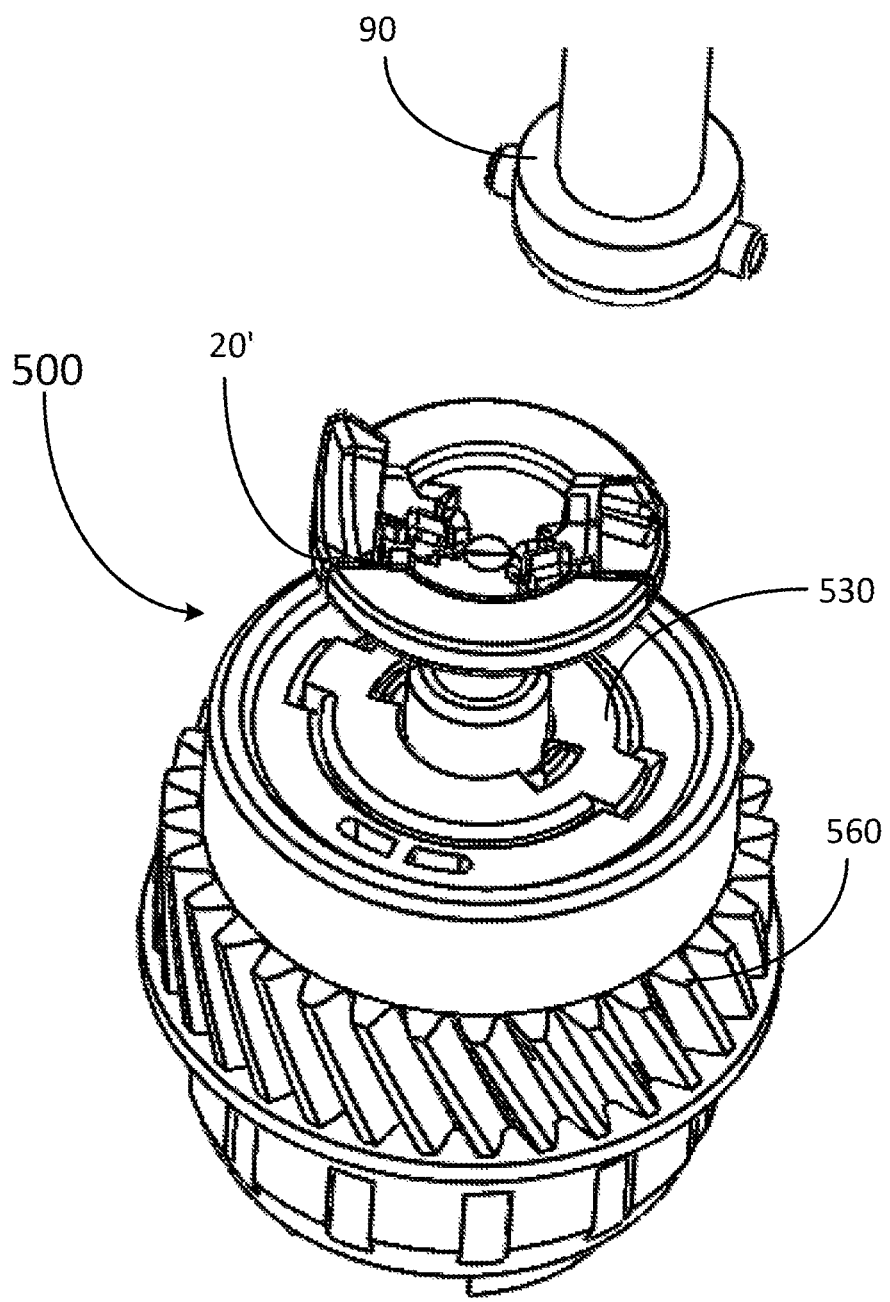
FIG. 39 is a schematic view showing a transmission device for a drum unit in a position for separating from or connecting to a drive member in accordance with one embodiment of the present invention.

In the embodiment shown in FIGS. 30 and 39, it is disclosed that the transmission device 500 comprises the transmission unit 20', the sleeve 530 and the housing 560. It should be appreciated to one skilled in the art that the present invention may have various configurations. For example, the transmission unit 20' may be replaced with the transmission unit 20, 20" or 420. In addition, the sleeve 530 and the housing 560 may be separately or integrally formed.

In the foregoing embodiments, the transmission units 20, 20' and 420 each has two engagement blocks 82. In an alternative embodiment, a different number of engagement blocks (for example, one, three, four, etc.) may also be used to implement the present invention.

When the transmission device is used, the housing 60 is fastened to a photosensitive drum 10 adapted for installation in a toner cartridge (not shown), and the engagement structure 80 of the transmission unit 20 sticks out of an end of the toner cartridge. When a user puts the toner cartridge into a casing of an electronic imaging device (not shown), the engagement structure 80 of the transmission unit 20 is engaged with a drive member 90 of the electronic imaging device located in the casing in a way that a part of the drive member 90 of the electronic imaging device is received in the receiving space 86 and two pillars 92 of the drive member 90 of the electronic imaging device are respectively received in and engaged with the engagement concaves 823, so that the photosensitive drum will be driven to rotate by the drive member 90 of the electronic imaging device.

According to the present invention, the transmission device of the present invention is simpler in structure than the conventional ones, and the way that the transmission device is connected with and separated from the drive member of an electronic imaging device is different from the conventional ones. By the features that the transmission unit is movable along and rotatable about the drum axis L, and the engagement blocks of the transmission unit have specially designed shape, the transmission unit can be connected with the drive member firmly and separated from the drive member smoothly no matter how the transmission device is entered into or removed from the casing of the electronic imaging device.

The detailed processes of how the transmission device is connected with and separated from the drive member are disclosed in the pending U.S. patent application Ser. Nos. 14/461,011 and 14/617,473, which are incorporated herein by reference, and are not repeated.

The foregoing description of the embodiments of the present invention has been presented only for the purposes of illustration and description and is not intended to be exhaustive or to limit the invention to the precise foil is disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the embodiments described therein.

What is claimed is:

1. A transmission device for engagement with a photosensitive drum having a drum axis, the transmission device comprising:
   a housing for being detachably and coaxially connected to the photosensitive drum;
   a sleeve coaxially disposed in the housing; and
   a transmission unit including a shaft coaxially disposed in the sleeve, coaxially rotatable and axially movable relative to the sleeve, and including a first part, a second part and a bushing; each one of the first part and the second part having a body and a base portion connected with an end of the body; the body of the first part and the body of the second part being detachably attached to each other; the bushing being sleeved onto the body of the first part and the body of the second part; the shaft further including a base defined by the base portion of the first part and the base portion of the second part;
   wherein the bushing of the shaft has a tubular body being sleeved onto the body of the first part and the body of the second part; wherein the tubular body has two notches formed on one end of the tubular body; the body of the first part has a positioning block received in one of the two notches; and the body of the second part has a positioning block received in the other one of the two notches.

2. The transmission device as claimed in claim 1, wherein the transmission unit further includes at least two engagement blocks extending outwardly from two opposite sides of the base of the shaft.

3. The transmission device as claimed in claim 2, wherein the base of the shaft has at least two opposite recesses, in which each of the engagement blocks is pivotally received and is rotatable around a pivotal axis which is perpendicular to the drum axis.

4. The transmission device as claimed in claim 3, wherein the transmission unit further includes at least two elastic bias members, each of the elastic bias members has a first end portion connected to the base of the shaft, an opposite second end portion connected to one of the engagement blocks corresponding in position to the second end portion, and a middle portion located between the first end portion and the second end portion and coaxially to the pivotal axis, and is able to provide a bias force against a rotation of said one of the engagement blocks.

5. The transmission device as claimed in claim 3, wherein each of the engagement blocks has a bottom member, an engagement claw extending upwardly from the bottom member, and a connecting means arranged in the bottom member for pivotably connecting the engagement block and the base of the shaft in a way that the connecting means corresponds in position to the pivotal axis; wherein the connecting means of each of the engagement blocks is a pair of through holes; and each of the engagement blocks is pivotably connected to the base of the shaft by a pin inserted through the through holes.

6. The transmission device as claimed in claim 1, wherein the shaft of the transmission unit further includes a pin, and the tubular body has a pair of through holes for insertion of the pin of the shaft.

7. The transmission device as claimed in claim 1, wherein the bushing of the shaft has a bottom disposed in one end of the tubular body.

8. The transmission device as claimed in claim 1, wherein the housing comprises a bottom, a top, an inner wall, a chamber defined by the inner wall and oriented along a longitudinal axis of the housing, a baffle wall extending axially from the bottom in the chamber, at least one baffle tab extending axially from the baffle wall toward the top in the chamber, and a gap defined between the baffle wall, the at least one baffle tab and the inner wall.

9. The transmission device as claimed in claim 8, wherein the sleeve comprises:
a top wall;
a side wall extending axially along a longitudinal axis of the sleeve from the top wall and being received in the gap of the housing; and
at least one retention member disposed in the top wall and being in contact with the at least one baffle tab of the housing;
wherein at least one guiding groove is defined by the at least one retention member and the baffle wall and the at least one baffle tab of the housing; and
wherein a rotation range and a moving range of the shaft in relation to the sleeve are determined by the at least one guiding groove.

10. The transmission device as claimed in claim 9, wherein one of the baffle wall of the housing and the side wall of the sleeve includes at least one protrusion, and the other one of the baffle wall of the housing and the side wall of the sleeve includes at least one groove for receiving the at least one protrusion.

11. The transmission device as claimed in claim 9, wherein the sleeve further comprises a slot disposed on the top wall of the sleeve and sized to allow a pin of the shaft of the transmission unit to pass through the slot.

12. The transmission device as claimed in claim 1, wherein the body of the first part and the body of the second part are semi-cylindrical in shape.

13. The transmission device as claimed in claim 1, wherein at least one guiding groove is provided between the housing and the sleeve, a rotation range and a moving range of the shaft in relation to the sleeve are determined by the at least one guiding groove.

14. A transmission unit for engagement with a photosensitive drum having a drum axis, wherein a sleeve is coaxially connected to the photosensitive drum, the transmission unit comprising:
a shaft coaxially rotatable and axially movable relative to the sleeve, the shaft including:
a first part having a first body and a first base portion connected with an end of the first body;
a second part having a second body and a second base portion connected with an end of the second body, the second body being detachably attached to the first body;
a base disposed at one end of the shaft, defined by the first base portion and the second base portion, and having at least two opposite recesses; and
a bushing sleeved onto the first body and the second body; wherein the bushing of the shaft has a tubular body being sleeved onto the first body of the first part and the second body of the second part; wherein the tubular body has two notches formed on one end of the tubular body; the first body of the first part has a positioning block received in one of the two notches; and the second body of the second part has a positioning block received in the other one of the two notches; and
at least two engagement blocks extending outwardly from two opposite sides of the base of the shaft and away from the shaft, each of the engagement blocks being pivotally received in the recess of the base of the shaft and being rotatable around a pivotal axis which is perpendicular to the drum axis.

15. The transmission unit as claimed in claim 14, further comprising at least two elastic bias members, each of the elastic bias members having a first end portion connected to the base of the shaft, an opposite second end portion connected to one of the engagement blocks corresponding in position to the second end portion, and a middle portion located between the first end portion and the second end portion and coaxially to the pivotal axis, and being able to provide a bias force against a rotation of said one of the engagement blocks.

16. The transmission unit as claimed in claim 14, wherein each of the engagement blocks has a bottom member, an engagement claw extending upwardly from the bottom member, and a connecting means arranged in the bottom member for pivotably connecting the engagement block and the base of the shaft in a way that the connecting means corresponds in position to the pivotal axis, wherein the connecting means of each of the engagement blocks is a pair of through holes; and each of the engagement blocks is pivotably connected to the base of the shaft by a pin inserted through the through holes.

17. The transmission unit as claimed in claim 14, wherein the shaft of the transmission unit further includes a pin, and the tubular body has a pair of through holes for insertion of the pin of the shaft.

18. The transmission unit as claimed in claim 14, wherein the bushing of the shaft has a bottom disposed in one end of the tubular body.

19. The transmission unit as claimed in claim 14, wherein the first body of the first part and the second body of the second part are semi-cylindrical in shape.

20. A drum unit for engagement with a photosensitive drum, the drum unit comprising the transmission unit of claim 14.

* * * * *